United States Patent
Katou et al.

(10) Patent No.: US 10,967,789 B2
(45) Date of Patent: Apr. 6, 2021

(54) SAFE DRIVING ASSISTANCE DEVICE

(71) Applicant: HITACHI CONSTRUCTION MACHINERY CO., LTD., Tokyo (JP)

(72) Inventors: Seiya Katou, Tokyo (JP); Hiroshi Watanabe, Tsuchiura (JP); Takeshi Ito, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/642,076

(22) PCT Filed: Aug. 28, 2018

(86) PCT No.: PCT/JP2018/031790
§ 371 (c)(1),
(2) Date: Feb. 26, 2020

(87) PCT Pub. No.: WO2019/049733
PCT Pub. Date: Mar. 14, 2019

(65) Prior Publication Data
US 2020/0180507 A1    Jun. 11, 2020

(30) Foreign Application Priority Data

Sep. 7, 2017    (JP) .............................. JP2017-172461

(51) Int. Cl.
*B60Q 1/00*    (2006.01)
*B60Q 9/00*    (2006.01)
(Continued)

(52) U.S. Cl.
CPC ............. *B60Q 9/008* (2013.01); *G08G 1/161* (2013.01); *H04W 4/46* (2018.02)

(58) Field of Classification Search
CPC ... B60Q 9/008; B60W 40/00; G06K 9/00791; G08G 1/161; G08G 1/163; H04W 4/46
(Continued)

(56) References Cited

U.S. PATENT DOCUMENTS 5,527,127 A * 6/1996 Junker .................... E01F 9/692
256/13.1
2010/0030473 A1* 2/2010 Au ...................... G06K 9/00791
701/301

(Continued)

FOREIGN PATENT DOCUMENTS

| JP | 05-127747 A | 5/1993 |
| JP | 10-283592 A | 10/1998 |

(Continued)

OTHER PUBLICATIONS

International Search Report of PCT/JP2018/031790 dated Nov. 20, 2018.

*Primary Examiner* — Naomi J Small
(74) *Attorney, Agent, or Firm* — Mattingly & Malur, PC

(57) ABSTRACT

A safe driving assistance device includes a region setting section that sets a collision risk determination region used for determining presence or absence of a collision risk of a host vehicle, and a determination section that determines a collision risk between the host vehicle and another vehicle using a host vehicle collision risk determination region, another vehicle collision risk determination region, and environment data. The host vehicle collision risk determination region of the host vehicle is set based on travel data of the host vehicle, a vehicle specification of the host vehicle, and the environment data obtained by the host vehicle. The other vehicle collision risk determination region is obtained by a vehicle-to-vehicle communication device. The other vehicle collision risk determination region
(Continued)

is the collision risk determination region of the other vehicle as a collision risk determination target with the host vehicle set by the other vehicle.

14 Claims, 12 Drawing Sheets

(51) Int. Cl.
*H04W 4/46* (2018.01)
*G08G 1/16* (2006.01)

(58) Field of Classification Search
USPC .......................................................... 340/435
See application file for complete search history.

(56) References Cited

U.S. PATENT DOCUMENTS

| | | | |
|---|---|---|---|
| 2012/0038489 A1* | 2/2012 | Goldshmidt | G08G 1/166 340/903 |
| 2014/0214237 A1 | 7/2014 | Kini et al. | |
| 2015/0266509 A1* | 9/2015 | Ignaczak | B60W 50/14 701/1 |
| 2016/0207534 A1* | 7/2016 | Nishimura | B60W 30/09 |
| 2017/0072851 A1* | 3/2017 | Shenoy | G08G 1/096775 |
| 2017/0169709 A1* | 6/2017 | Ando | G08G 1/161 |
| 2018/0281785 A1* | 10/2018 | Berntorp | G08G 1/166 |

FOREIGN PATENT DOCUMENTS

| | | |
|---|---|---|
| JP | 2004-504216 A | 2/2004 |
| JP | 2005-145301 A | 6/2005 |
| JP | 2009-059082 A | 3/2009 |
| JP | 2014-078107 A | 5/2014 |
| JP | 2015-210734 A | 11/2015 |
| JP | 2015-210737 A | 11/2015 |
| JP | 2017-111576 A | 6/2017 |
| WO | 2017/138658 A1 | 8/2017 |

* cited by examiner

| IDENTIFIER | POSITION INFORMATION | | | SPEED [km/h] | TRAVELING DIRECTION | WIDTH | LENGTH | TYPE OF VEHICLE | REGISTERED TIME |
|---|---|---|---|---|---|---|---|---|---|
| | x | y | z | | | | | | |
| 1 | 20 | 20 | 0 | 30 | 230 | 10 | 15 | DUMP RUCK | 10:55 |
| 2 | 10 | 40 | 0 | 30 | 230 | 3 | 5 | LIGHT VEHICLE | 11:15 |
| - | | | | | | | | | |

SAFE DRIVING ASSISTANCE DEVICE

TECHNICAL FIELD

The present invention relates to a safe driving assistance technique that prevents a rear end collision and a collision of vehicles in a mine.

BACKGROUND ART

In a mine, a construction site, and the like, a heavy haulage vehicle, such as a dump truck, is used. There is a technique to detect a shoulder in order to avoid a collision between vehicles and prevents falling under such an environment. For example, Patent Literature 1 discloses a technique that "includes shoulder detecting sections to scan a road surface in front of a vehicle in the traveling direction of the vehicle to detect a shoulder located on the road surface and a shoulder measuring device to measure the orientation of the vehicle relative to the shoulder detected by the shoulder detecting sections and the distance to the shoulder; and the two shoulder detecting sections are installed on the traveling direction side of the vehicle. The two shoulder detecting sections are installed in a higher position than the upper ends of the front wheels (excerpt from ABSTRACT)."

In a mine, a construction site, and the like, a mound (berm) is formed as a safety facility in order to physically separate a travel route. In Patent Literature 2, there is disclosed a technique in which "a control system that includes a communicating device, a locating device configured to generate a first signal indicative of a location of a machine, and a sensor configured to generate a second signal indicative of contact of a machine with a berm is disclosed. This control system may also have an offboard controller configured to generate a first set of coordinates of a dump target, and to assign the first set of coordinates to the onboard controller for use in controlling the machine. The offboard controller may also be configured to detect contact of the machine with the berm based on the second signal during reverse travel toward the dump target, and to generate a second set of coordinates of the dump target to correspond with a location of the machine at a time of contact detection (excerpt from ABSTRACT)."

Furthermore, Patent Literature 3 discloses a technique that "disposes a transmitter and a receiver on each unmanned self traveling body to confirm a position of a preceding unmanned self traveling body, and determines whether positional data of another preceding unmanned self traveling body is within an area where a collision is possible or not, to prevent the collision." Specifically, there is disclosed a technique that "disposes a transmitting device that transmits positional data of itself calculated with a position detection device and a receiving device that receives another piece of positional data transmitted by another unmanned self traveling body in each unmanned self traveling body, and is configured to perform an operation following a planned traveling course by a guide control device while a collision prevention system calculates an emergency stop area E1, an ordinary stop area E2, a second deceleration area E3, and a first deceleration area E4 in order from high risk based on the positional data of itself, and controls the unmanned self traveling body to an emergency stop, an ordinary stop, a second deceleration, or a first deceleration to prevent a collision when the above described received positional data of another unmanned self traveling body is within the above described area (excerpt from ABSTRACT)."

CITATION LIST

Patent Literature

PATENT LITERATURE 1: JAPANESE UNEXAMINED PATENT APPLICATION PUBLICATION NO. 2015-210734
PATENT LITERATURE 2: US2014/0214237A1
PATENT LITERATURE 3: JAPANESE UNEXAMINED PATENT APPLICATION PUBLICATION NO. H05-127747

SUMMARY OF INVENTION

Technical Problem

However, warning by determining a collision risk using only a positional relationship with detected another vehicle in some cases generates a warning even though there exists a safety facility, such as a mound, in between. That is, it is highly possible that the system is low in reliability with low warning generation accuracy.

The present invention has been made in consideration of the above described circumstance, and it is an objective of the present invention to provide a technique that warns a collision risk with high accuracy to assist safe driving.

Solution to Problem

The present invention provides a safe driving assistance device that includes a position detecting device, a vehicle speed sensor and a steering angle sensor, a storage device, an environment recognition device, a vehicle-to-vehicle communication device, a region setting section, and a determination section. The position detecting device obtains current position information of a vehicle. The vehicle speed sensor and the steering angle sensor obtain travel data including a traveling direction and a speed. The storage device stores a vehicle specification including a size of the vehicle. The environment recognition device obtains environment data including an altitude of a geography. The vehicle-to-vehicle communication device wirelessly and communicatively couples the vehicle to another vehicle. The region setting section sets a collision risk determination region used for determining presence or absence of a collision risk of a host vehicle. The determination section sets a host vehicle collision risk determination region, which is the collision risk determination region of the host vehicle, based on travel data of the host vehicle, the vehicle specification of the host vehicle, and the environment data obtained by the host vehicle, obtains an other vehicle collision risk determination region, which is the collision risk determination region of the other vehicle as a collision risk determination target with the host vehicle set by the other vehicle, set by the other vehicle through the vehicle-to-vehicle communication device, and determines a collision risk between the host vehicle and the other vehicle using the host vehicle collision risk determination region, the other vehicle collision risk determination region, and environment data.

Advantageous Effects of Invention

The present invention ensures warning a collision risk with high accuracy to assist a safe driving. Note that problems, configurations, and effects other than those described above will be clarified by explanation of embodiments described below.

DESCRIPTION OF EMBODIMENTS

Figure 1A:
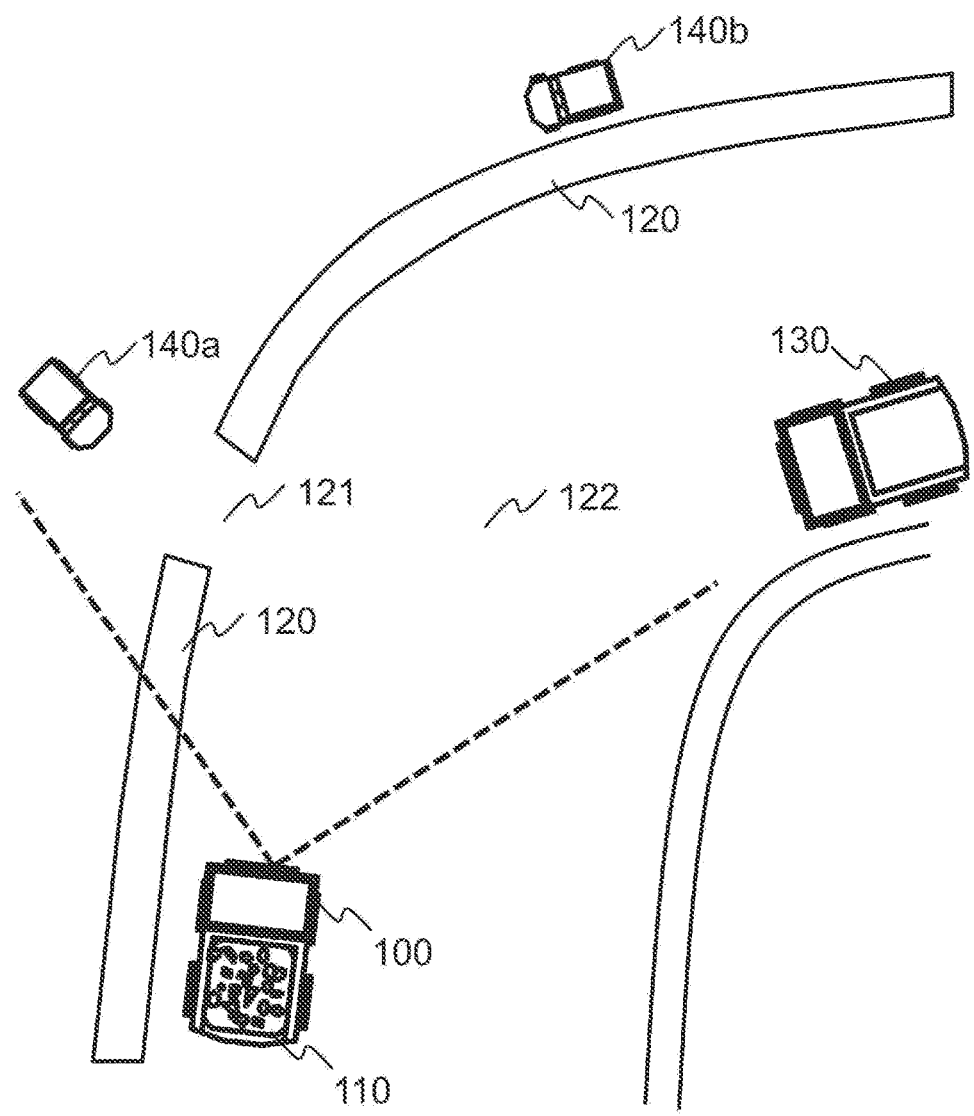
FIG. 1A is an explanatory drawing for explaining a usage environment of a safe driving assistance system of a first embodiment.

The following describes embodiments of the present invention in details with reference to the drawings. Note that, in all the drawings for explaining the embodiments, those having the same function are attached by the same reference numerals unless otherwise stated, and their repeated explanation may be omitted in some cases.

First Embodiment

A description will be given of a first embodiment of the present invention. In this embodiment, not only a positional relationship between a host vehicle and other vehicles, but, for example, information on a safety facility near the host vehicle, such as a mound (berm), and travel data and specifications of the vehicles are further used for determining a collision risk with the other vehicles. First, an environment where a safe driving assistance system 100 of the embodiment is used will be described by referring to FIG. 1A.

The safe driving assistance system 100 of the embodiment is assumed to be used in a mine. In the mine, for example, a plurality of large sized heavy machine vehicles 110, 130 and general vehicles 140a, 140b are mixed and operated. On a road surface of a travel route 122 on which the large sized heavy machine vehicles 110, 130 travel, mounds (berms) 120 are formed so that a shoulder is perceivable.

The large sized heavy machine vehicles 110, 130 are, for example, dump trucks, excavators, and the like. The general vehicles 140a, 140b are ordinary vehicles that are permitted to travel on a public road. The general vehicles 140a, 140b are, for example, used for conveying personnel and conveying maintenance workers to the large sized heavy machine vehicles 110.

Figure 1B:
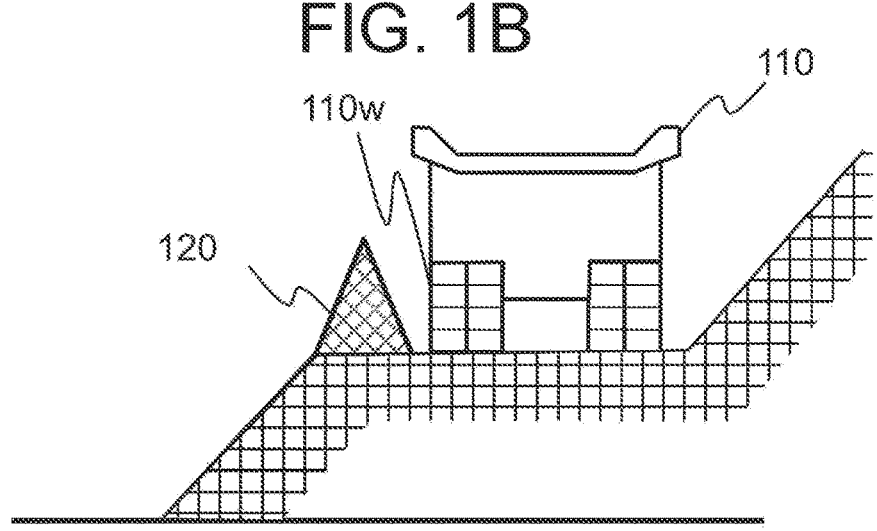
FIG. 1B is an explanatory drawing for explaining a berm.

As illustrated in FIG. 1B, in order to differentiate the transport path (travel route) 122 and other regions, the berm 120 is basically continuously formed along the travel route 122. The berms 120 have various heights corresponding to positions. For example, there are one with a height of approximately 5 m sufficiently higher than a diameter of a wheel 110w of the large sized heavy machine vehicles 110, and one with a height of approximately 1 m that contains a risk of the large sized heavy machine vehicle 110 going over.

As illustrated in FIG. 1A, each of the berms 120 has a clearance 121 such that the general vehicles 140a, 140b can come in to and go out of the travel route 122. The clearance 121 is, for example, disposed to have a width through which general vehicles 140 can pass but the large sized heavy machine vehicles 110 cannot pass. The clearance 121 has, for example, the same altitude as that of the travel route 122.

Note that FIG. 1A exemplarily illustrates the case where two large sized heavy machine vehicles 110, 130 and two general vehicles 140a, 140b exist, and the safe driving assistance system 100 is mounted on the large sized heavy machine vehicles 110. However, the number of vehicles is not limited to this. The types of vehicles are also not limited to this. For example, a wheel loader, a grader, and the like may be included. The number of vehicles on which the safe driving assistance system 100 is mounted is not limited to this. Note that the general vehicles 140a, 140b are represented as the general vehicles 140 when distinctions are not specifically necessary hereinafter.

Figure 2A:
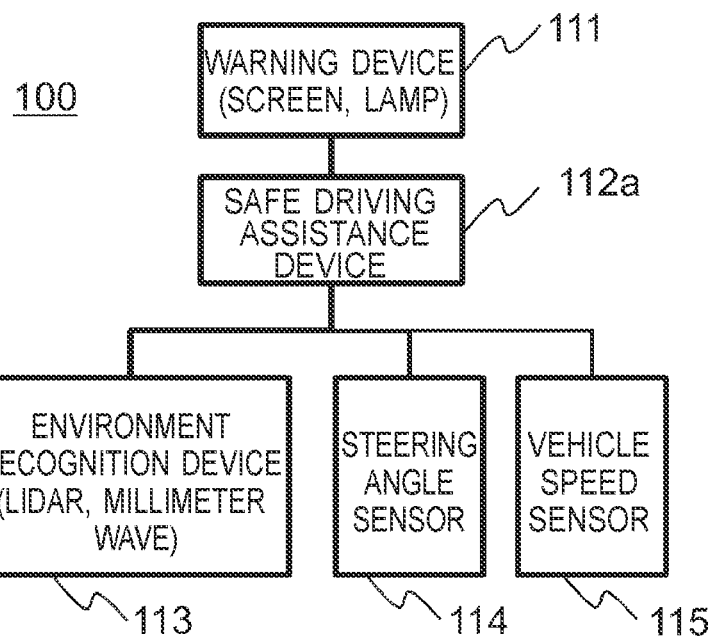
FIG. 2A is a block diagram of the safe driving assistance system of the first embodiment.

Next, the safe driving assistance system 100 mounted on the large sized heavy machine vehicle (hereinafter, host vehicle) 110 of the embodiment will be described by referring to FIG. 2A. As illustrated in the drawing, the safe driving assistance system 100 of the embodiment includes a warning device 111, a safe driving assistance device 112, an environment recognition device 113, a steering angle sensor 114, and a vehicle speed sensor 115.

The environment recognition device 113 includes a sensor that detects obstacles near the host vehicle 110, and outputs the detection result to the safe driving assistance device 112. The sensor included in the environment recognition device 113 is, for example, a lidar or a millimeter wave sensor, and detects, for example, the berm 120 and other vehicles as the obstacles.

The environment recognition device 113 in the embodiment periodically senses a peripheral area of the host vehicle using the sensor, and obtains positions and heights of the obstacles, including detected other vehicles, as peripheral information. From the obtained peripheral information, other vehicle traveling information (other vehicle traveling data) as traveling information of other vehicles and environment information (environment data) as information other than the other vehicle traveling information are generated to be output to the safe driving assistance device 112 as the detection results.

Note that the other vehicle traveling information includes, for example, identification information (identifier), traveling data (position information, vehicle speed, traveling direction), and vehicle specifications (width, length, type of vehicle) of other vehicles within a visual field range of the environment recognition device 113. The safe driving assistance system 100 of the embodiment is used in an environment, such as a mine. In such a usage condition, types of vehicles that are used are preliminarily determined in many cases. The environment recognition device 113 of the embodiment preliminarily holds the vehicle specifications of the types of vehicles that are planned to be used, and uses these vehicle specifications and peripheral information obtained at different times to generate other vehicles' traveling information for each of other vehicles.

The steering angle sensor 114 periodically obtains a steering angle of the host vehicle 110 and outputs the steering angle to the safe driving assistance device 112. The steering angle sensor 114 detects, for example, a rotation (steering angle) of a front wheel shaft as the steering angle.

The vehicle speed sensor 115 periodically obtains a vehicle speed of the host vehicle 110 and outputs the vehicle speed to the safe driving assistance device 112. The vehicle speed sensor 115 detects, for example, a rotational speed of a wheel (driven wheel) as the vehicle speed. Note that the steering angle sensor 114 and the vehicle speed sensor 115 may be synchronized with the environment recognition device 113 to obtain the steering angle and the vehicle speed, respectively, and output the steering angle and the vehicle speed to the safe driving assistance device 112.

The safe driving assistance device 112 is coupled to the environment recognition device 113, the steering angle sensor 114, and the vehicle speed sensor 115, and determines presence or absence of a collision risk based on these outputs. When it is determined that a collision risk is present, warning data is output to the warning device 111. Note that the safe driving assistance device 112 performs a determination every time the safe driving assistance device 112 receives an output from the environment recognition device 113, the steering angle sensor 114, and the vehicle speed sensor 115.

The warning data output by the safe driving assistance device 112 may include the environment information and the other vehicle traveling information received from the environment recognition device 113. Displaying these pieces of information on the warning device 111 helps an operator to easily grasp the situation on the screen.

The warning device 111 is coupled to the safe driving assistance device 112, and outputs a warning to the operator of the vehicle upon receiving the warning data from the safe driving assistance device 112. The warning device 111 includes, for example, a display and a buzzer to output a warning screen on the display and output an alarming sound using the buzzer. In the embodiment, for example, the warning is output while the warning data is being received. Note that, when the warning data including the environment information and the other vehicle traveling information is received from the safe driving assistance device 112, these pieces of information may also be displayed.

In the embodiment, each of these devices coordinate to determine a collision risk by considering, not only the positional relationship between other vehicles and the host vehicle 110, but also the safety facility, such as the berm 120.

For example, even though the host vehicle 110 and other vehicles are in colliding relationships in a current traveling direction, when there is the berm 120 between the vehicles, the collision risk is determined using the vehicle speed, the height of this berm 120, and the diameter of the wheel 110w. This ensures reducing unnecessary warnings and giving a necessary and sufficient warning to the operator.

Next, the safe driving assistance device 112 of the embodiment will be described.

[Hardware Configuration]

Figure 3:
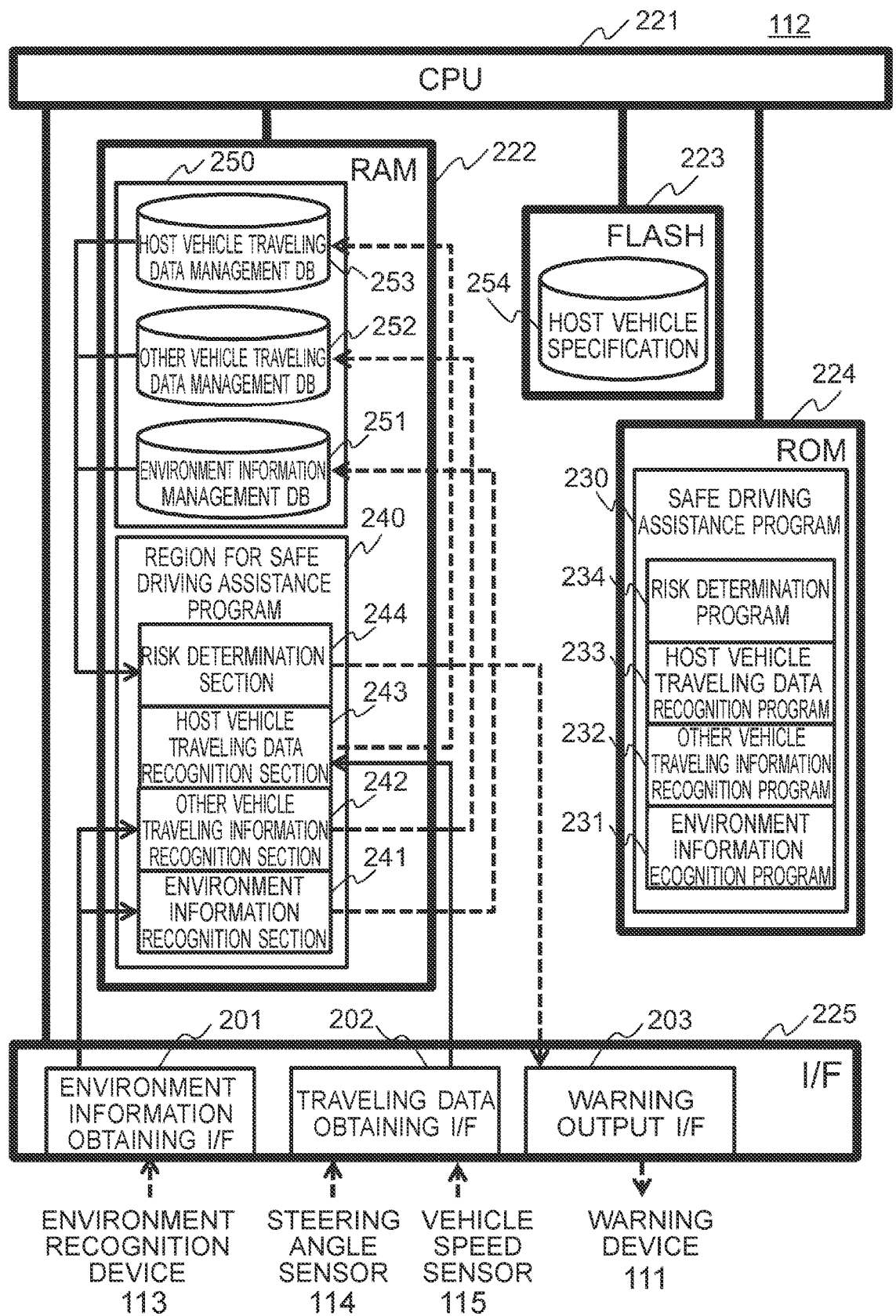
FIG. 3 is a block diagram of a safe driving assistance device of the first embodiment.

The safe driving assistance device 112 includes a CPU 221, a RAM 222, a FLASH memory 223, a ROM 224, and an interface (I/F) 225, as illustrated in FIG. 3.

The ROM 224 is a nonvolatile memory exclusive for reading. In the ROM 224, a safe driving assistance program 230 that achieves functions of the safe driving assistance device 112 is recorded. Note that the safe driving assistance program 230 is the same program irrespective of the vehicle that includes the safe driving assistance device 112.

The safe driving assistance program 230 includes, for example, an environment information recognition program 231, another vehicle traveling information recognition program 232, a host vehicle traveling data recognition program 233, and a risk determination program 234.

The FLASH memory 223 is a rewritable nonvolatile memory. In the FLASH memory 223, a host vehicle specification 254 as fixed (static) information of the host vehicle 110 is recorded. The host vehicle specification 254 is the width and the length, the height of the wheel, the type of vehicle, and the like, of the host vehicle, and is preliminarily registered. Note that, the host vehicle specification 254 recorded in the FLASH memory 223 differs from each vehicle.

The RAM 222 is a writable volatile memory. The RAM 222 includes a region for safe driving assistance program 240 and a temporary storage region 250.

The region for safe driving assistance program 240 is a region where the safe driving assistance program 230 recorded in the ROM 224 is extracted after activating the safe driving assistance device 112.

The temporary storage region 250 is a region temporarily stores and updates information input from an outside via the I/F 225. The temporary storage region 250 holds an environment information management database (DB) 251, another vehicle traveling data management DB 252, and a host vehicle traveling data management DB 253. The temporary storage region 250 temporarily holds various kinds of data generated during processing.

The CPU 221 executes the programs recorded in the ROM 224. In the embodiment, the CPU 221 extracts the safe driving assistance program 230 recorded in the ROM 224 in the region for safe driving assistance program 240 of the RAM 222, and executes the safe driving assistance program 230 using the data stored in the temporary storage region 250.

Note that functions achieved by the CPU 221 executing respective programs of each safe driving assistance program 230 are referred to as an environment information recognition section 241, another vehicle traveling information recognition section 242, a host vehicle traveling data recognition section 243, and a risk determination section 244.

The I/F 225 is an interface between the safe driving assistance device 112 and another device constituting the safe driving assistance system 100. In the embodiment, signals and data are transmitted and received between the environment recognition device 113, the steering angle sensor 114, the vehicle speed sensor 115, and the warning device 111.

In order to achieve this, the I/F 225 includes an environment information obtaining I/F 201, a traveling data obtaining I/F 202, and a warning output I/F 203.

The environment information obtaining I/F 201 is an interface with the environment recognition device 113, and obtains the environment information and the other vehicle traveling information as the peripheral information of the host vehicle 110 from the environment recognition device 113. The other vehicle traveling information is output to the other vehicle traveling information recognition section 242, and the environment information is output to the environment information recognition section 241.

The traveling data obtaining I/F 202 receives traveling data, such as the steering angle and the vehicle speed, of the host vehicle 110 from the steering angle sensor 114 and the vehicle speed sensor 115, respectively, and outputs the traveling data to the host vehicle traveling data recognition section 243.

The warning output I/F 203 outputs warning data to the warning device 111 upon receiving the warning data from the risk determination section 244.

Next, the functions achieved by the respective safe driving assistance programs and data held in the temporary storage region 250 will be described.

[Environment Information Recognition Section]

The environment information recognition section 241 registers the environment information input from the environment information obtaining I/F 201 into the environment information management DB 251. In response to a request from the risk determination section 244, the environment information inside the environment information management DB 251 is output to the risk determination section 244.

Figures 4A, 4B:
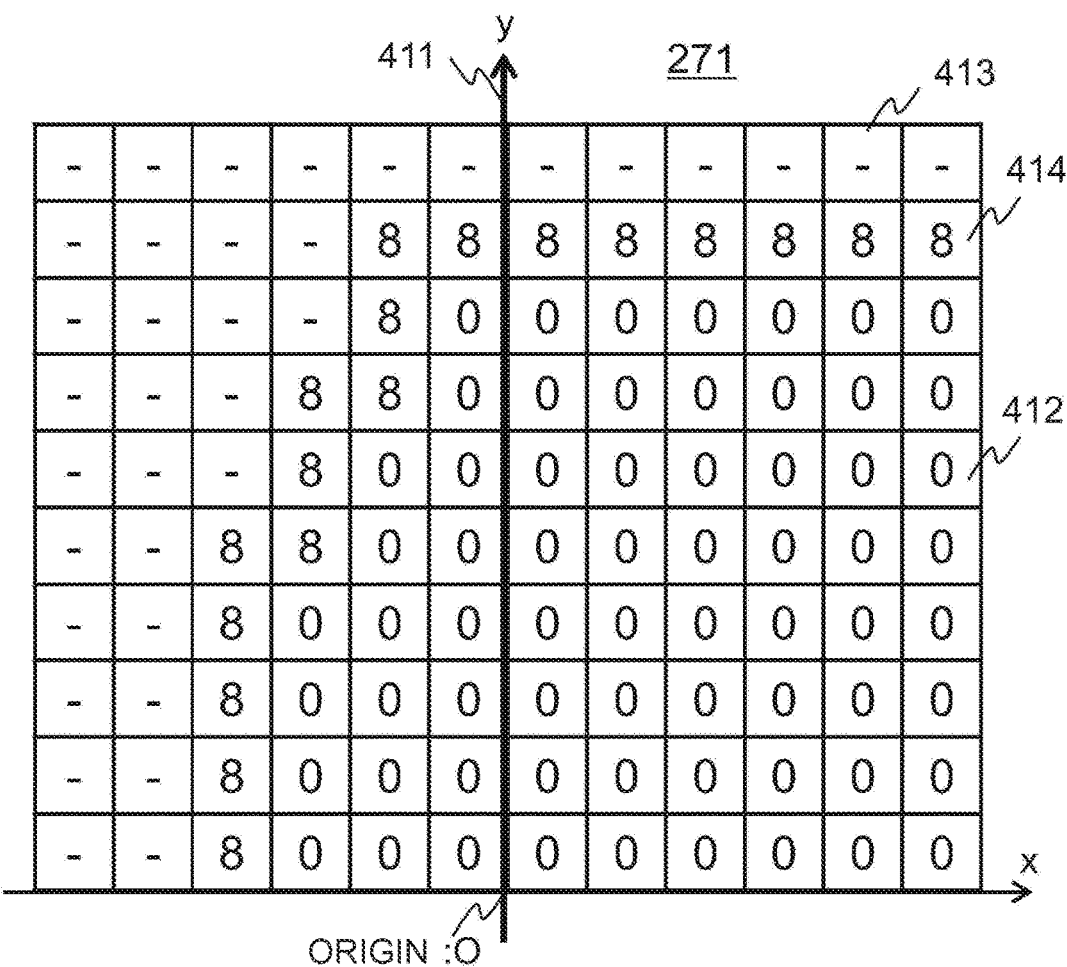
FIG. 4A is an explanatory drawing for explaining an example of environment information of the first embodiment.
FIG. 4B is an explanatory drawing for explaining an example of other vehicle traveling information of the first embodiment.

Here, an example of environment information 271 managed by the environment information management DB 251 is illustrated in FIG. 4A. The environment information 271 is information of geography and relief of a detection region of the sensor included in the environment recognition device 113. In the embodiment, as the information of geography and relief, for example, as illustrated in this drawing, detected altitudes of respective grid regions separating a projection plane of the detection region are registered.

For the environment information 271, for example, a local coordinate system with a current position (installation position of environment recognition device 113) of the host vehicle 110 as an origin O, and a y axis positive direction as a traveling direction of the host vehicle 110 is used. On the projection plane of the detection area, the direction perpendicular to the y axis direction, that is, a width direction of the host vehicle 110 is an x axial direction. Note that the other vehicle traveling information is removed from the environment information 271. Note that the traveling direction is determined by the steering angle of the host vehicle information.

The size of each grid in the grid region is set corresponding to a resolution of the environment recognition device 113. In the example in FIG. 4A, an actual distance corresponding to one side of the grid is, for example, approximately 5 m. In the embodiment, for each grid region, an altitude based on the altitude of the current position of the host vehicle 110 is registered as an altitude. For example, "0" is set in a grid region 412 that corresponds to a position with an altitude identical to that of the current host vehicle 110 position, and a detection altitude ("8" in example of FIG. 4A) of, for example, the berm 120 is set in a grid region 414 (obstacle region) corresponding to an obstacle, such as the berm 120 (hereinafter referred to as the berm 120 or the like).

For example, when behind the berm 120 or the like is a cliff, the environment recognition device 113 cannot detect the height of the corresponding position. Thus, information that means not detected ("-" in FIG. 4A) is set in a grid region 413 of which altitude cannot be detected by the environment recognition device 113.

The environment information 271 illustrated in FIG. 4A illustrates an environment where the berm 120 or the like, which is the berm 120 that has a curve in front of the host vehicle 110, with an altitude of 8 m exists.

Note that, in the embodiment, the environment information 271 illustrated in FIG. 4A is transmitted from the environment recognition device 113 every time it is obtained by the environment recognition device 113. The environment information recognition section 241 replaces the environment information 271 in the environment information management DB 251 with new environment information 271 every time the environment information 271 is obtained from the environment recognition device 113. That is, the latest environment information 271 is constantly registered in the environment information management DB 251.

The environment information recognition section 241 outputs the latest environment information 271 registered in the environment information management DB 251 to the risk determination section 244 upon receiving the request from the risk determination section 244. At this time, the information necessary for region setting described below, for example, the actual distance information corresponding to one side of the grid like region is also output together.

[Other Vehicle Traveling Information Recognition Section]

The other vehicle traveling information recognition section 242 registers the other vehicle traveling information input from the environment information obtaining I/F 201 to the other vehicle traveling data management DB 252. In response to the request from the risk determination section 244, the other vehicle traveling information in the other vehicle traveling data management DB 252 is output to the risk determination section 244.

The other vehicle traveling data management DB 252 manages the other vehicle traveling information within the visual field range of the environment recognition device 113. As described above, the other vehicle traveling information includes the identification information (identifier), the position information, the vehicle speed, the traveling direction, the width, the length, the type of vehicle, and the like. In order to destroy the data after a predetermined period passes since the obtainment, time information, such as a registered time, is also held.

FIG. 4B is an example of other vehicle traveling information 272 managed by the other vehicle traveling data management DB 252. As illustrated in the drawing, the other vehicle traveling information 272 includes information of an identifier 421, position information (x, y, z) 422, a speed (vehicle speed) 425, a traveling direction 426, a width 427, a length 428, a type of vehicle 429, and a registered time 430 for each of other vehicles.

The identifier 421 is an identifier uniquely assigned for each of other vehicles operating in a mine as described above.

The position information (x, y, z) 422 is relative positions of the respective other vehicles using the current position of the host vehicle 110 as a base point. Note that, in the embodiment, the relative position is indicated by coordinate values (x, y, z) of a local coordinate system identical to that of the environment information 271.

The speed 425 is speeds of the respective other vehicles. The traveling direction 426 is values representing angles of the traveling direction of the respective other vehicles using the traveling direction 411 of the host vehicle 110 as a start line. Here, clockwise is a positive direction. For example, in the case of another vehicle that progresses toward the host vehicle 110 from the front direction of the host vehicle 110, 180 is set.

The width 427 and the length 428 indicate sizes (widths and lengths) of the respective other vehicles. The type of vehicle 429 indicates the types of vehicles of the respective other vehicles, and for example, a dump truck, an excavator, and a light vehicle are set.

The registered time 430 is times at which the other vehicle traveling information 272 of the respective other vehicles are registered in the other vehicle traveling data management DB 252.

The other vehicle traveling information recognition section 242 replaces the data having the identical identifier 421 with the latest data every time the other vehicle traveling information is received from the environment recognition device 113. The other vehicle traveling information recognition section 242 accesses to the other vehicle traveling data management DB 252 at predetermined time intervals to destroy the other vehicle traveling information whose elapsed time since the registered time 430 is equal to or more than a preliminarily determined threshold value. This is because, when no input is made from the environment information obtaining I/F 201 for a certain period of time, the corresponding vehicle is determined that it has moved outside the detection range. Also, when the position information 422 is outside the detection area of the environment recognition device 113, it may be configured to destroy the data.

[Host Vehicle Traveling Data Recognition Section]

The host vehicle traveling data recognition section 243 registers the host vehicle traveling data input from the traveling data obtaining I/F 202 into the host vehicle traveling data management DB 253. In response to the request from the risk determination section 244, the host vehicle traveling data in the host vehicle traveling data management DB 253 is output to the risk determination section 244. The host vehicle traveling data includes the vehicle speed and the steering angle. Note that the host vehicle traveling data managed by the host vehicle traveling data management DB 253 is dynamic information that is updated every time the host vehicle traveling data is received from the traveling data obtaining I/F 202.

[Risk Determination Section]

The risk determination section 244 determines presence or absence of the collision risk with another vehicle for determination for each of other vehicles as determination targets (another vehicle for determination) based on the dynamic host vehicle traveling data managed by the host vehicle traveling data management DB 253, the static host vehicle specification set in the host vehicle specification 254, the other vehicle traveling information 272 managed by the other vehicle traveling data management DB 252, and the environment information 271 managed by the environment information management DB 251. In the embodiment, furthermore, presence or absence of the collision risk with the berm 120 or the like is also determined.

In the embodiment, even if there exists another vehicle in the traveling direction of the host vehicle 110, the collision risk with the other vehicle is redetermined when the berm 120 or the like exists between both vehicles.

Figure 5:
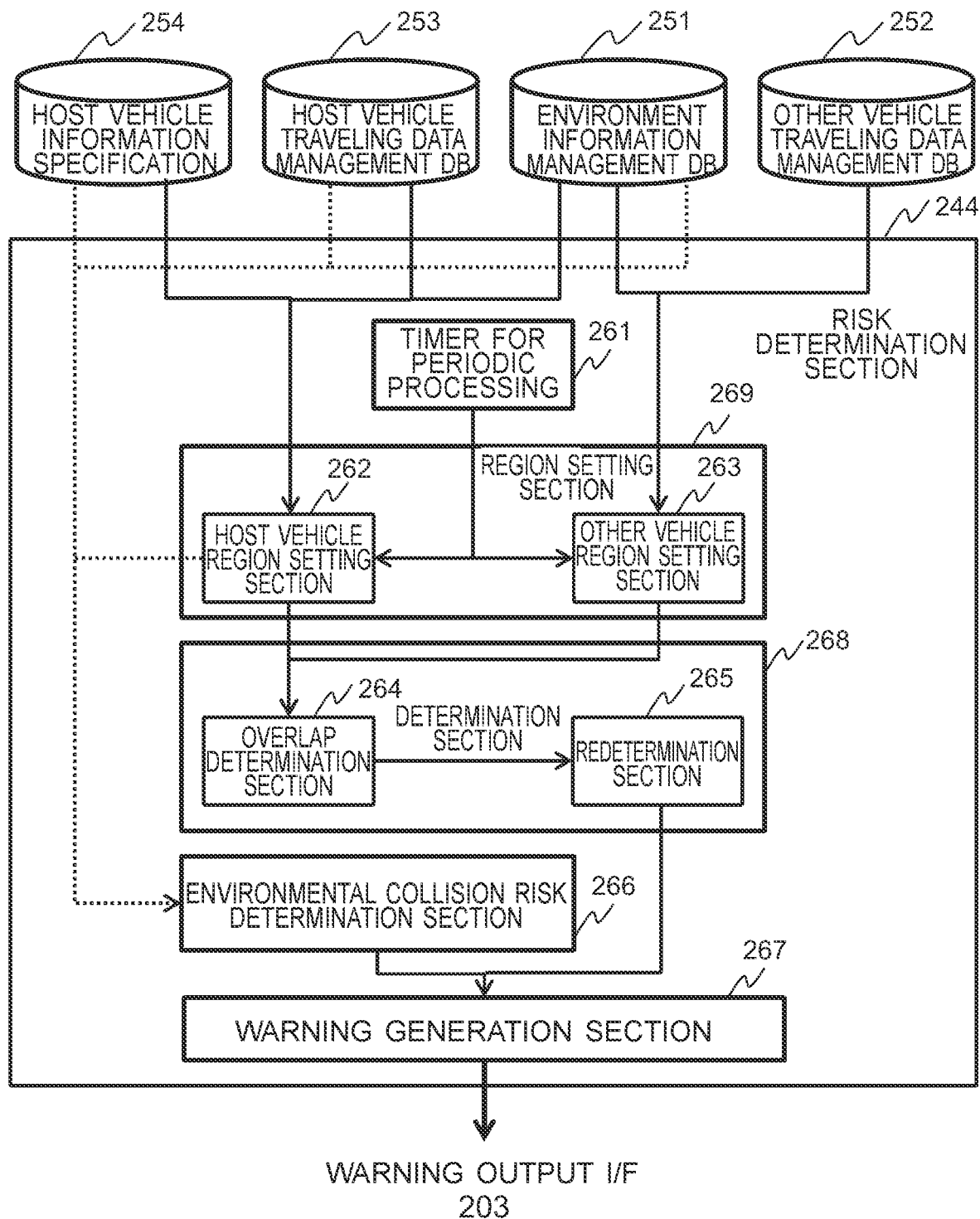
FIG. 5 is a function block diagram of a risk determination section of the first embodiment.

A detailed description will be given of the risk determination section 244 of the embodiment that achieves such a risk determination process by referring to FIG. 5. The risk determination section 244 of the embodiment includes a timer for periodic processing 261, a region setting section 269, a determination section 268, an environmental collision risk determination section 266, and a warning generation section 267.

[Timer for Periodic Processing]

The timer for periodic processing 261 is a timer for timekeeping. The risk determination section 244 periodically executes a risk determination process in accordance with the timekeeping of the timer for periodic processing 261.

[Region Setting Section]

The risk determination section 244 in the embodiment basically determines that the risk of collision is present when Time To Collision (TTC: window time until collision) between the host vehicle and another vehicle as a determination target (another vehicle for determination) is equal to or less than a preliminarily determined threshold value. In order to simply achieve this, the region setting section 269 sets a collision risk determination region (hereinafter, simply referred to as a risk determination region) for each of the host vehicle 110 and the other vehicle for determination. These risk determination regions are regions to which the vehicles possibly proceed within a predetermined time, and are regions used to determine presence/absence of the collision risk with other vehicles.

The region setting section 269 includes a host vehicle risk determination region setting section (host vehicle region setting section) 262 and another vehicle risk determination region setting section (other vehicle region setting section) 263.

The host vehicle region setting section 262 sets the risk determination region of the host vehicle (host vehicle region) on the environment information 271 using the host vehicle traveling data, the host vehicle specification, and the environment information 271. The host vehicle region is a region to which the host vehicle 110 possibly proceeds within a predetermined time T1. Note that the host vehicle traveling data and the host vehicle specification are hereinafter jointly referred to as host vehicle information.

Figure 6A:
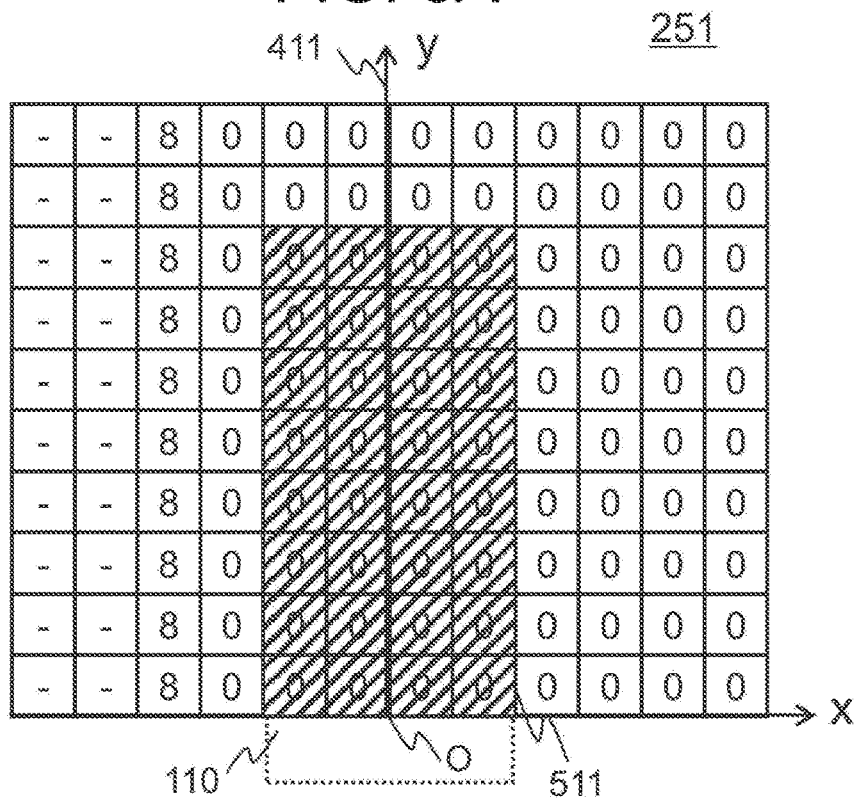
FIG. 6A and FIG. 6B are explanatory drawings for explaining a risk determination region setting method of the first embodiment.

As illustrated in FIG. 6A, a host vehicle region 511 is set as a rectangular region with a position of the host vehicle 110 on the environment information as a bottom side and the traveling direction as a height direction. The size of the bottom side is, for example, a width of the host vehicle 110 and the height is a length corresponding to a vehicle speed.

The length corresponding to the vehicle speed is calculated using the vehicle speed and information on an actual distance corresponding to one side of the grid like region. For example, the number of the grid like regions corresponding to the maximum actual distance reached in the above described predetermined time T1.

Note that the shape of the host vehicle region 511 is not limited to the rectangular region. For example, it may be a fan shape using the traveling direction from the current position (base point) of the host vehicle as a center line direction and having the length corresponding to the vehicle speed as a radius.

When a geography element (berm 120 or the like) that becomes a barrier exists within the host vehicle region 511 set in the above described method, the region to which the host vehicle 110 possibly proceeds is also set as a second host vehicle region along the shape of this berm 120 or the like.

The setting method of the host vehicle region in this case will be described by referring to FIG. 6B. This is an example when there is the berm 120 or the like ahead of the host vehicle 110, and the travel route 122 curves along the berm 120 or the like.

Even in such a case, the host vehicle region setting section 262, first, uses the width, the vehicle speed, and the traveling direction of the host vehicle 110 and sets the host vehicle region 511 in a method similar to the example in FIG. 6A.

At this time, when a berm region 521 corresponding to the berm 120 or the like exists within the host vehicle region 511, the host vehicle 110 is highly likely to proceed along this berm 120 or the like. In view of this, the traveling direction is changed along the berm 120 or the like, and approximately the same sized region of the host vehicle region as a sum of a region overlapping with the berm 120 or the like and a region ahead with respect to the berm 120 or the like is set in the traveling direction changed as a second host vehicle region 512.

The specific setting method is as follows. First, the rectangular width region is set as the host vehicle region toward the traveling direction 411 in order from the current host vehicle 110 position. When a part of one end in the width direction of the host vehicle region overlaps with a region corresponding to the berm 120 or the like (berm region; obstacle region), the region is shifted to an opposite side of the berm region by an amount of the width overlapped with the berm region, and, from this state, the obtainment of the region is continued in the traveling direction 411. When all the regions in the width direction of the host vehicle region overlap with the berm region, the traveling direction is squarely changed in the opposite direction of the one end that overlaps with the berm region previously, and the setting of the region is continued.

Figure 6B:
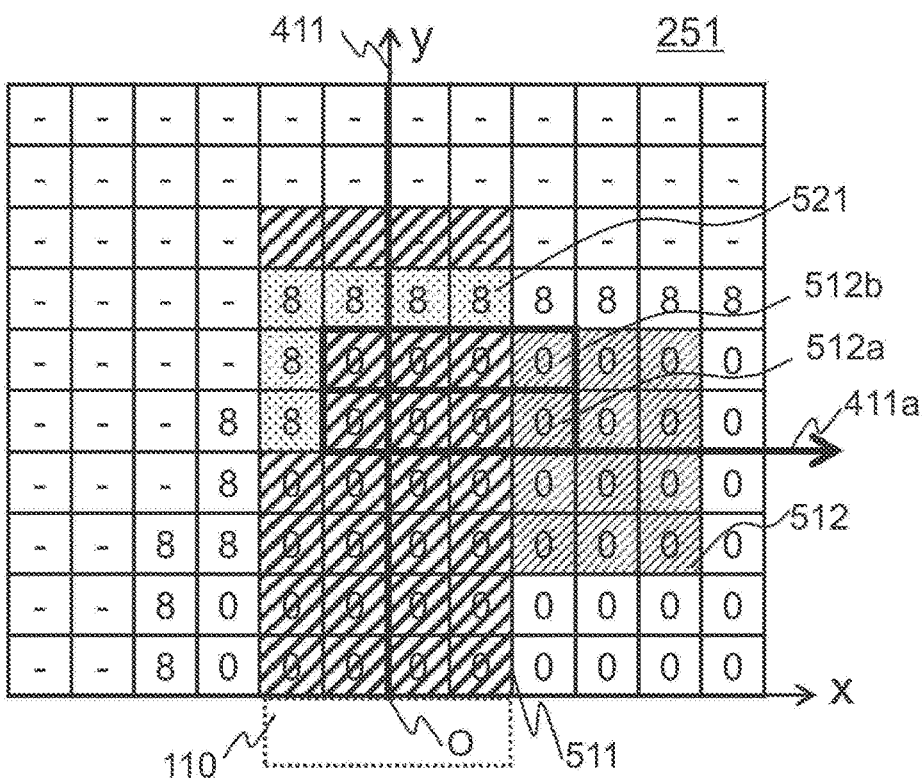

In the case of FIG. 6B, at the point where the host vehicle region is set for five grid regions (squares) in the traveling direction 411, one square on the left end overlaps with the berm region 521. Therefore, the host vehicle region is shifted by one square to the right side, and the region is continuously set with the width of four squares (512a, 512b). At the point where the host vehicle region is set for two more squares in the traveling direction, all the regions in the width direction overlap with the berm region 521. Here, the left side already overlaps with the berm region 521. In view of this, the traveling direction 411a is changed by 90 degrees rightward in the drawing to set the second host vehicle region 512 with the width of four squares.

In this case, both the second host vehicle region 512 corrected considering the berm region 521 and the host vehicle region 511 first set are output as the host vehicle region of the host vehicle 110.

The other vehicle region setting section 263 sets the risk determination regions of other vehicles (other vehicle regions) on the environment information 271 using the environment information 271 and the other vehicle traveling information 272. A setting method and shapes of the other vehicle regions are basically similar to the setting method and the shape of the host vehicle region. However, the other vehicle regions use the positions of the other vehicles on the environment information 271 as the bottom side.

Furthermore, when there is the berm 120 or the like that has the clearance 121 along the other vehicle region, the other vehicle region setting section 263 jointly sets the other vehicle region when traveling through this clearance 121, in addition to the other vehicle region that is set in the ordinary method. The details will be described later.

Note that, in the embodiment, the region setting section 269 holds the information of the host vehicle region and the other vehicle region set in the environment information 271, such as the coordinates of each of apexes of the respective regions in the temporary storage region 250.

[Determination Section]

The determination section 268 is a with-vehicle collision risk determination section that determines presence or absence of the collision risks between the host vehicle 110 and other vehicles. In this embodiment, presence or absence of the collision risk is determined for each vehicle whose other vehicle traveling information is detected by the environment recognition device 113. When the determination result results that the collision risk is present, an alert signal (other vehicle risk signal) meaning that the collision risk with another vehicle is present is output to the warning generation section 267.

The determination section 268 determines the collision risk between the host vehicle 110 and another vehicle for determination based on an overlapping state of the host vehicle region set by the host vehicle region setting section 262 and another vehicle region of the other vehicle for determination set by the other vehicle region setting section 263, the host vehicle information, and the environment information 271. In order to achieve this, the determination section 268 includes an overlap determination section 264 and a redetermination section 265.

The overlap determination section 264, for example, determines presence or absence of overlaps between the host vehicle region and the other vehicle region of the other vehicle for determination. The determination section 268 basically determines that the collision risk is present when the overlap determination section 264 determines that the overlap is present.

Figure 7A:
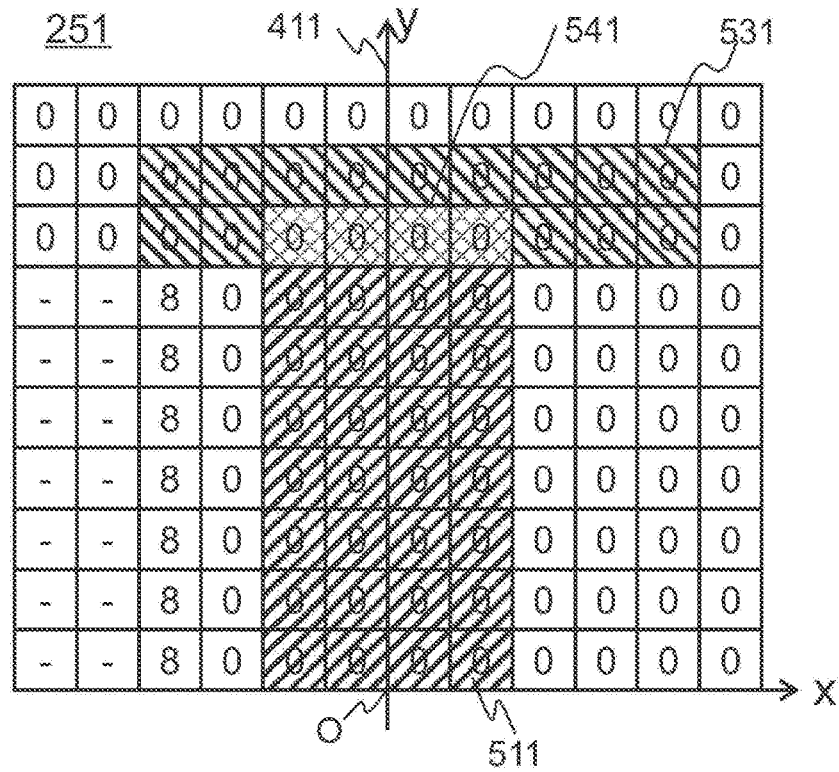
FIG. 7A and FIG. 7B are explanatory drawings for explaining a determination method for presence or absence of a collision risk of the first embodiment.
Figure 7B:
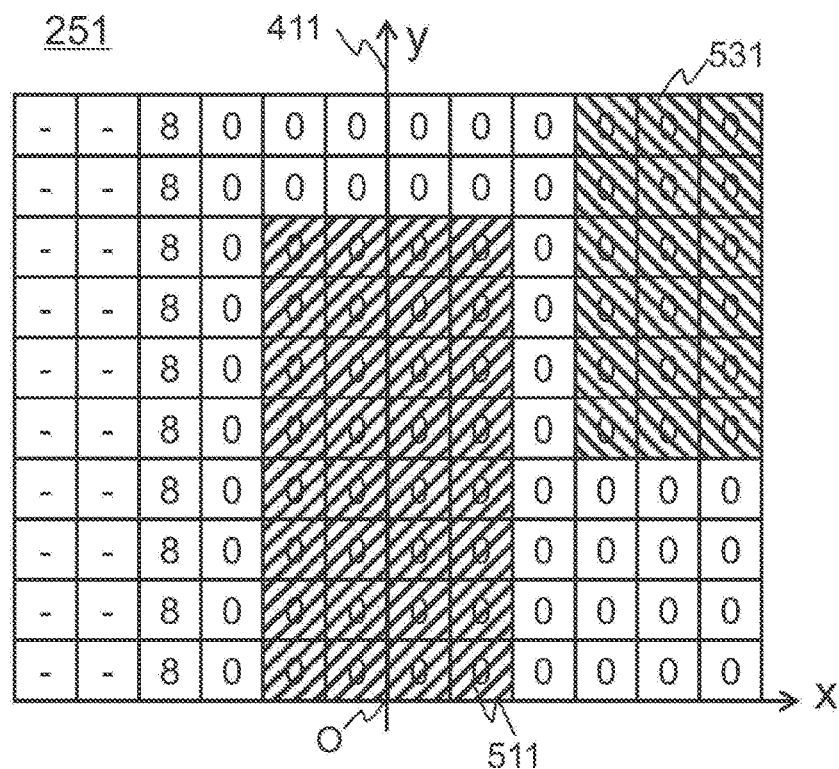

For example, when the host vehicle region 511 and another vehicle region 531 of another vehicle for determination are set as illustrated in FIG. 7A, the overlap determination section 264 determines that the overlap is present. Meanwhile, when it is set as illustrated in FIG. 7B, it is determined that no overlap is present.

Figure 8A:
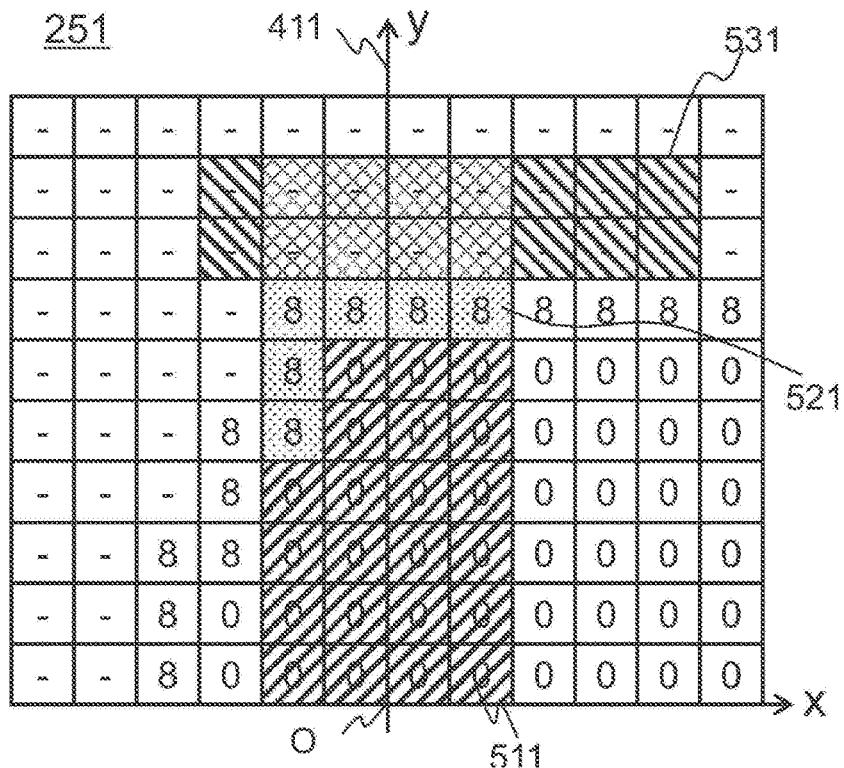
FIG. 8A and FIG. 8B are explanatory drawings for explaining the determination method for presence or absence of the collision risk of the first embodiment.

The redetermination section 265 redetermines presence or absence of the collision risk based on the host vehicle information and the environment information 271. For example, when the host vehicle region 511 and the other vehicle region 531 overlap, when the berm 120 or the like exists between the host vehicle 110 and the other vehicle for determination, it is redetermined that no collision risk is present. That is, as illustrated in FIG. 8A, when, on the environment information 271, the berm region 521 exists between the origin O and the other vehicle for determination position on the environment information 271, it is redetermined that no collision risk is present.

At this time, the redetermination section 265 may redetermine presence or absence of the collision risk using the diameter of the wheel 110w of the host vehicle 110 and the vehicle speed of the host vehicle 110. Furthermore, when the berm 120 or the like has the clearance 121, presence or absence of the collision risk may be redetermined using the other vehicle traveling information. That is, when the clearance 121 of the berm 120 or the like exists ahead in traveling of the host vehicle 110, the collision risk may be determined considering possibilities that other vehicles coming in from the clearance 121.

For example, even if the host vehicle region and the other vehicle region of the other vehicle for determination overlap and the berm 120 or the like exists between the host vehicle 110 and the other vehicle for determination, the redetermination section 265 determines that the collision risk is present when a height ratio of the berm 120 or the like to the diameter of the wheel 110w of the host vehicle 110 is less than a predetermined value. This is because it is determined that the host vehicle 110 can go over the berm 120 or the like.

Specifically, for example, when the height of the berm 120 or the like is less than half the height of the wheel 110w, that is, when the above described ratio is less than 0.5, it is determined to be able to be gone over. Conversely, when the ratio is equal to or more than 0.5, it is determined not to be able to be gone over. For example, when the diameter of the wheel 110w is 10 m, since all the detected berm 120 or the like has the height of 8 m in the example illustrated in FIG. 8B, it is considered that the risk of the host vehicle 110 going over this berm 120 or the like is rare. Therefore, the redetermination section 265 determines that no collision risk is present with the other vehicle for determination at a position with this berm 120 or the like interposed in between.

Even if the host vehicle region and the other vehicle region of the other vehicle for determination overlap, the berm 120 or the like exists between the host vehicle 110 and the other vehicle for determination, and the height ratio of the berm 120 or the like to the diameter of the wheel 110w of the host vehicle 110 is less than the predetermined value, the redetermination section 265 determines that no collision risk is present when the speed of the host vehicle 110 is less than the preliminarily determined reference speed. In this case, it is because, even if the height of the berm 120 or the like is low compared with the diameter of the wheel 110w, it is determined that the berm 120 cannot be gone over when the vehicle speed is slow.

Figure 8B:
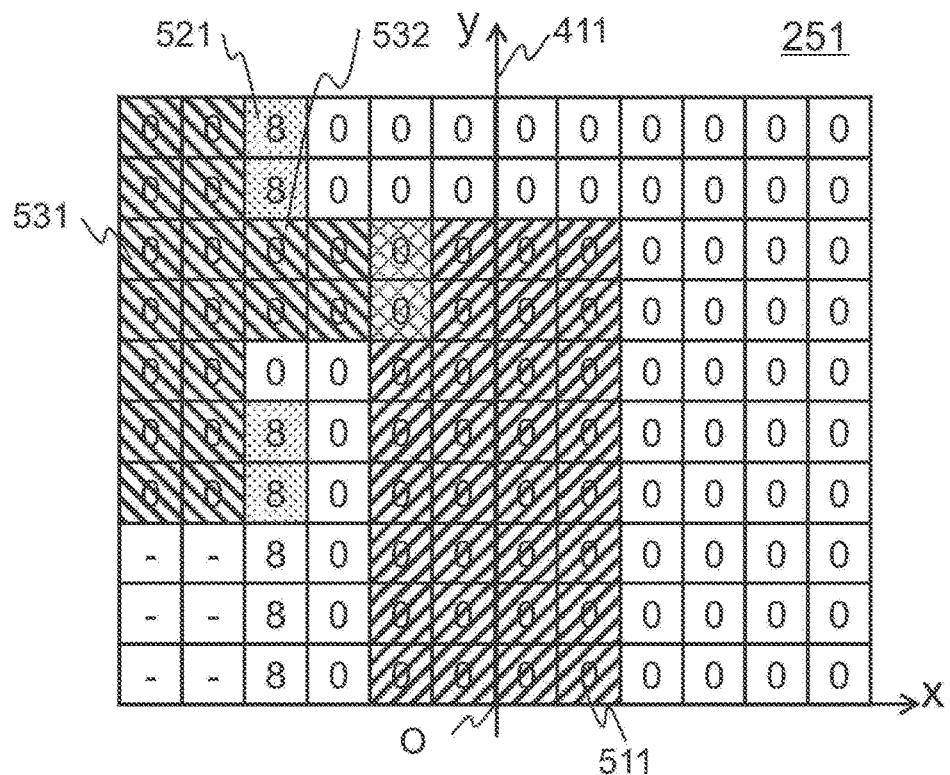

Note that, as described above, when the other vehicle region 531 is set along a region corresponding to the berm 120 or the like having the clearance 121 and when the width of this clearance 121 is wider than the width of the other vehicle for determination, as illustrated in FIG. 8B, another vehicle region 532 is also set when this clearance 121 is traveled through. Therefore, in this case, the host vehicle region 511 and the other vehicle region 532 of the other vehicle for determination overlap.

In the case of the state illustrated in FIG. 8B, both the regions overlap, but the berm 120 or the like exists between the host vehicle 110 and the other vehicle for determination. However, the clearance 121 equal to or more than the width of the other vehicle for determination exists in the berm 120 or the like. In such a case, the redetermination section 265 determines that the collision risk is present. Note that, as described above, the clearance 121 is a region that is comparable with the travel route 122 and has an altitude on which the vehicle can pass through. Therefore, for example, when the region corresponding to the clearance 121 (clearance region) is in contact with the other vehicle region 532, and the width of this clearance region is equal to or more than the width of the other vehicle for determination, the redetermination section 265 determines that the clearance 121 is present to determine that the collision risk is present.

Meanwhile, when the width of this clearance 121 is smaller than the width of the other vehicle for determination, the other vehicle region 532 is not set. Therefore, in this case, the host vehicle region 511 and the other vehicle region 531 do not overlap. In view of this, the determination section 268 determines that no collision risk is present.

Note that the determination section 268 determines presence or absence of the collision risk for each of the other vehicle for determination. Therefore, the above described other vehicle risk signal may include information to identify the other vehicle for determination that is determined to have the collision risk.

[Environmental Collision Risk Determination Section]

The environmental collision risk determination section 266 determines presence or absence of the collision risk of the host vehicle 110 and the berm 120 or the like using the host vehicle information and the environment information 271. When it is determined that the collision risk with the berm 120 or the like is present, a berm risk signal is output as the alert signal to the warning generation section 267.

Specifically, the environmental collision risk determination section 266 determines that the collision risk is present when there is the berm 120 or the like having a height equal to or more than a first threshold value preliminarily determined in the traveling direction of the host vehicle, and the TTC is equal to or less than a second threshold value preliminarily determined.

The first threshold value is a value with which it is determinable whether the host vehicle 110 can go over this berm 120 or not. For example, 0.5 times of the diameter of the wheel 110w of the host vehicle 110. In this case, when the height of the berm 120 or the like is smaller than the half of the diameter of the wheel 110w of the host vehicle 110, it is possible to go over, and it is determined that the collision risk is present. The second threshold value is, for example, determined by the speed and the like of the host vehicle.

[Warning Generation Section]

The warning generation section 267 generates warning data every time the alert signal is received from the determination section 268 and the environmental collision risk determination section 266, and outputs the warning data to the warning output I/F 203.

In this embodiment, for example, stylized messages are preliminarily held in the ROM 224 or the like by being associated with each of the other vehicle risk signal and the berm risk signal. When each of the alert signals are received, the warning generation section 267 extracts the corresponding stylized message and outputs the stylized message as the warning data.

Here, a description will be given of examples of the warning output to the warning device 111 that has received the warning data. Here, the warning device 111 is a display, and the case where a warning screen including a message is output as the warning is exemplarily illustrated.

Figure 9A:
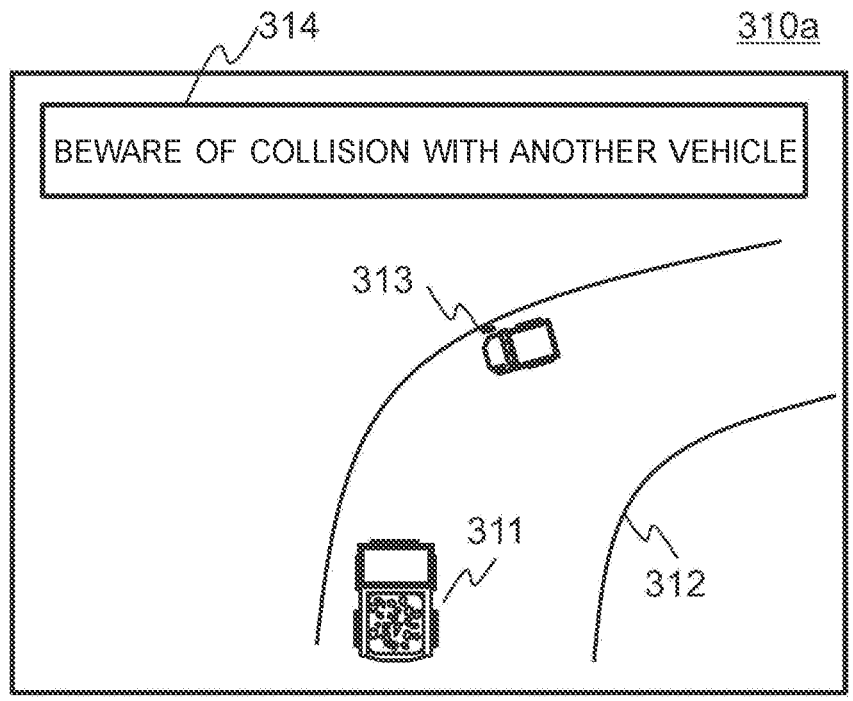
FIG. 9A is an explanatory drawing for explaining an exemplary display screen when a collision risk is present according to the first embodiment.

FIG. 9A is an example of a display screen 310a output as the warning screen on the warning device 111 by the warning data generated when the other vehicle risk signal is received. When the other vehicle risk signal is received from the determination section 268, the warning generation section 267 generates the warning data using a message 314 preliminarily prepared by being associated with the other vehicle risk signal. The warning data is, for example, the message 314 and the like as "beware of collision with light vehicle" as illustrated in this drawing.

Note that when the other vehicle risk signal includes the environment information and the other vehicle traveling information, the warning generation section 267 may generate the warning data such that an icon 311 indicative of the host vehicle 110, an icon 313 indicative of the other vehicle for determination, and a graphic 312 indicative of a detected geography (such as the berm 120 or the like) are displayed as illustrated in FIG. 9A, not only the message 314.

Note that, as described above, the determination section 268 and the environmental collision risk determination section 266 receive the environment information 271 at predetermined time intervals, determine presence or absence of the collision risk, and only when it is determined that the collision risk is present, output the warning signal to the warning generation section 267. Therefore, the warning generation section 267 does not generate the warning data when the alert signal is not received for the predetermined time interval or more.

Figure 9B:
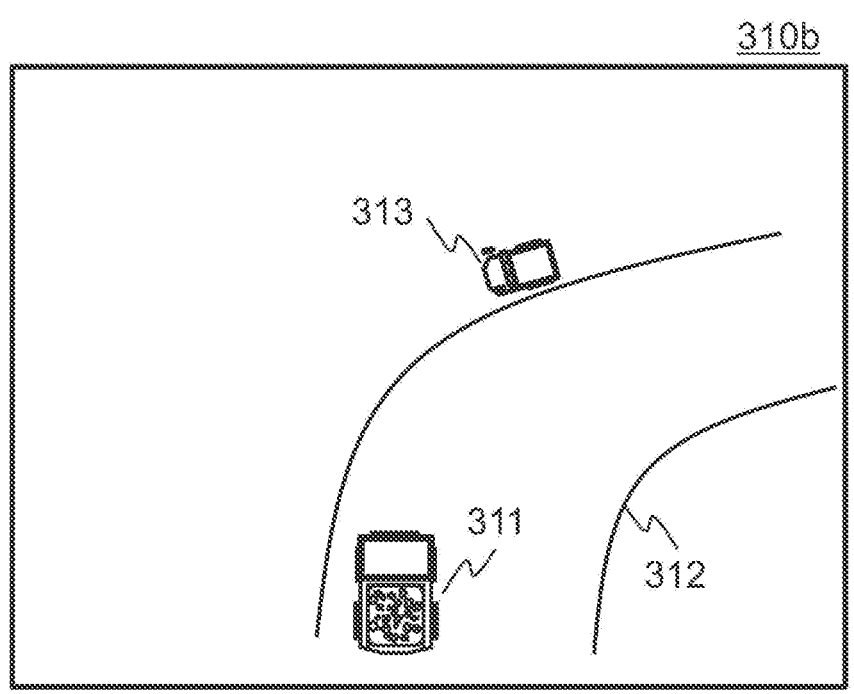
FIG. 9B is an explanatory drawing for explaining an exemplary display screen when no collision risk is present of the first embodiment.

However, even if the warning data is not generated, only the display data of the environment information and the other vehicle traveling information may be continuously generated to be output to the warning device 111. In this case, as illustrated in FIG. 9B, on the display of the warning device 111, only a display by this display data is made as a display screen 310b.

[Risk Determination Process]

Figure 10:
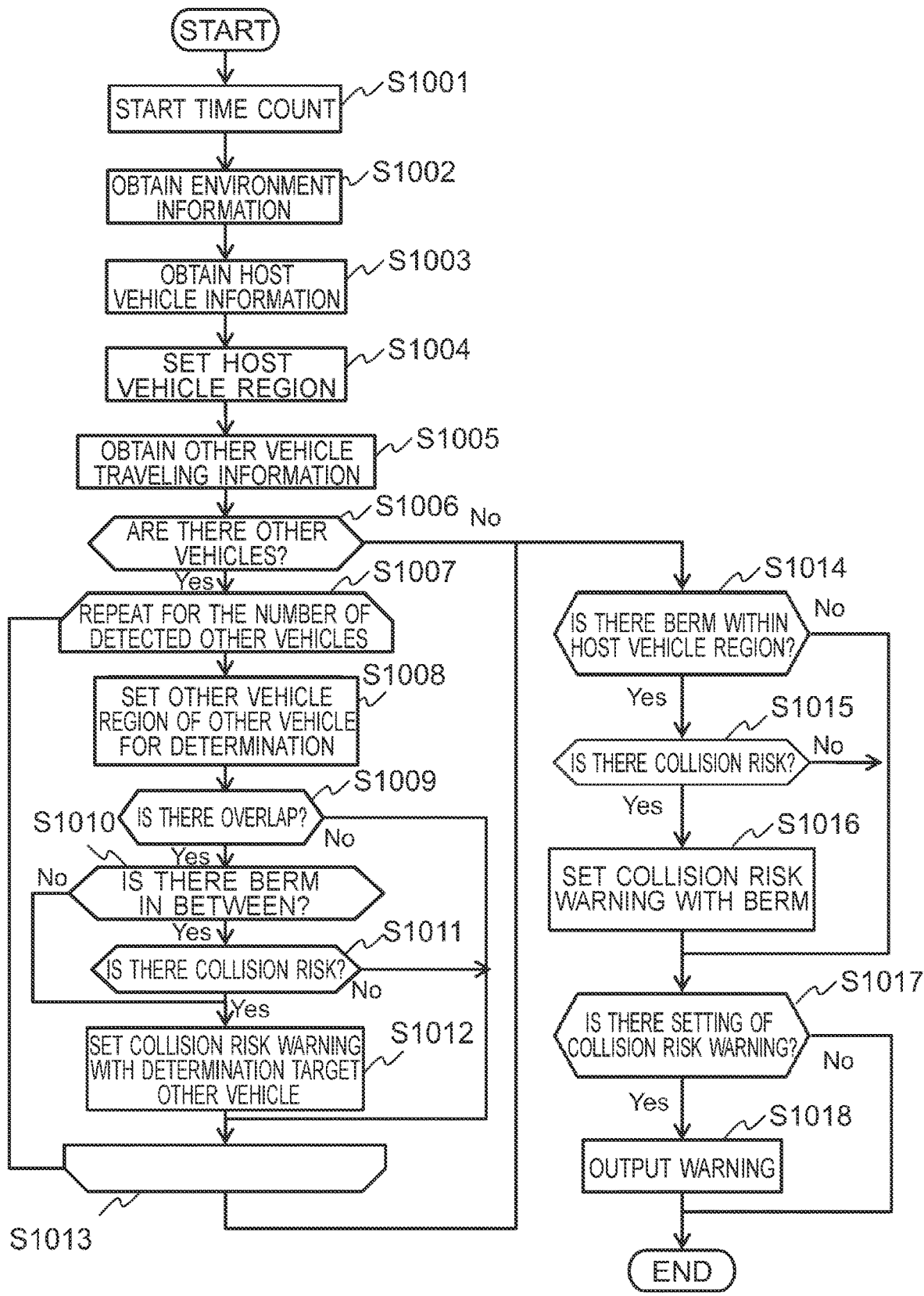
FIG. 10 is a flowchart of a risk determination process according to the first embodiment.

Next, a procedure of the risk determination process by the risk determination section 244 will be described by referring to FIG. 10. The risk determination section 244 periodically executes the risk determination process.

First, a time count is started with the timer for periodic processing 261 (Step S1001).

The host vehicle region setting section 262 obtains the environment information 271 from the environment information management DB 251 (Step S1002).

Next, the host vehicle region setting section 262 obtains the host vehicle traveling data from the host vehicle traveling data management DB 253 and the host vehicle specification from the host vehicle specification 254 as the respective pieces of the host vehicle information (Step S1003).

The host vehicle region setting section 262 sets the host vehicle region on the environment information 271 obtained at Step S1002 using the obtained host vehicle information (Step S1004). At this time, when the berm 120 or the like does not exist ahead, for example, the host vehicle region 511 illustrated in FIG. 6A is set. On the other hand, when the berm 120 or the like exists ahead, the host vehicle region 511 and the second host vehicle region 512 illustrated in FIG. 6B are set.

Next, the other vehicle region setting section 263 obtains the other vehicle traveling information 272 from the other vehicle traveling data management DB 252 (Step S1005). At this point, the number of the vehicles registered in the other vehicle traveling data management DB 252 is confirmed (Step S1006). Note that, here, the recorded number of the other vehicle traveling information 272 registered in the other vehicle traveling data management DB 252 is the number of the vehicles.

When there is no other vehicle at Step S1006, the procedure proceeds to Step S1014 described later.

When there exists even one other vehicle at Step S1006, the other vehicle region setting section 263 repeats the following process on each of the registered other vehicles (Step S1007).

First, the other vehicle region 531 is set on the environment information 271 for the other vehicle for determination (Step S1008). At this time, even for the other vehicle, when the berm 120 or the like are present, the other vehicle region 531 along the berm 120 or the like as described in FIG. 6B is also set. When there is the clearance 121 in the berm 120, the other vehicle region 532 when there is the clearance 121 described in FIG. 8B is set together for the other vehicle.

The overlap determination section 264 determines whether the set other vehicle region 531 overlaps with the host vehicle region 511 or not (Step S1009). Here, as illustrated in FIG. 7B, when there is no overlap, the procedure proceeds to Step S1013 described below.

On the other hand, when there is an overlap, the redetermination section 265 determines whether is the berm 120 or the like between the host vehicle 110 and the other vehicle for determination or not (Step S1010). Here, it is determined whether there is data of altitude larger than 0 on the environment information 271 or not.

As illustrated in FIG. 7A, when there is no berm 120 or the like, the redetermination section 265 determines that the collision risk is present, and the procedure proceeds to Step S1012 described later.

When there is the berm 120 or the like, the redetermination section 265 determines whether it is possible for the host vehicle 110 to go over this berm or the like or not with the above described method using the information, such as the vehicle speed of the host vehicle 110 and the diameter of the wheel 110w and the height of the berm 120 or the like in between to determine presence or absence of the collision risk (Step S1011).

At Step S1011 and Step S1010, when the redetermination section 265 determines that the collision risk is present, the determination section 268 sets the other vehicle risk signal as the alert signal (Step S1012).

Note that, when it is determined that no collision risk is present at Step S1011, the procedure proceeds to Step S1013 described below.

The determination section 268 repeats the process of Step S1007 to S1012 for all the other vehicles detected at Step S1006 (Step S1013).

When the above described process is finished for all the other vehicles, the environmental collision risk determination section 266 determines the collision possibility between the host vehicle 110 and the berm 120 or the like. Specifically, the following process is performed.

First, it is determined whether there is the berm 120 or the like within the host vehicle region or not (Step S1014).

When there is the berm 120 or the like, the environmental collision risk determination section 266 determines the collision risk between the berm 120 or the like and the host vehicle 110 with the above described method using the height of the berm 120 or the like and the size of the wheel 110w and the vehicle speed of the host vehicle 110 (Step S1015).

When it is determined that the collision risk is present, the berm risk signal is set as the alert signal (Step S1016).

On the other hand, when it is determined that no berm 120 or the like is present at Step S1014, or when it is determined that no collision risk is present at S1015, the procedure proceeds to S1017 described below.

The warning generation section 267 determines whether the alert signal is set or not (Step S1017), and when the alert signal is set, the warning data corresponding to this alert signal is generated. The generated warning data is output to the warning device 111 via the warning output I/F 203 (Step S1018). On the other hand, when it is not set, the process is terminated in this state.

As described above, the safe driving assistance device 112 of the embodiment includes the region setting section 269, the determination section 268, and the warning section (the warning generation section 267 and the warning device 111). The region setting section 269 sets a risk determination region of a vehicle on environment data using travel data including a current position, a traveling direction, and a speed of the vehicle, a vehicle specification including a size of the vehicle, and the environment data including altitudes of a geography. The determination section 268 determines presence or absence of a collision risk between a host vehicle and another vehicle for determination using a host vehicle region as the risk determination region of the host vehicle 110, another vehicle region as the risk determination region of the other vehicle for determination as a determination target other vehicle, and the environment data. The warning section outputs a warning when the determination section determines that the collision risk is present.

Thus, the embodiment uses, not only the relative distance and the TTC between the vehicles, but the environment information of the berm 120 or the like detected by the environment recognition device 113, for determining the collision risk. In view of this, even in a condition where it is determined that the collision risk is present by using only the relative distance and the TTC, it is determined that no collision risk is present under a predetermined condition. For example, it is when there is the berm 120 or the like of a sufficient height between the host vehicle 110 and the other vehicle for determination. Therefore, the embodiment ensures determining presence or absence of the collision risk with further high accuracy. Accordingly, an unnecessary warning can be reduced.

In determining presence or absence of the collision risk, the embodiment may consider, not only the height of the berm 120 or the like, but a vehicle speed, a diameter of the wheel 110w, and the like of the host vehicle 110. Presence or absence of the clearance 121 of the berm 120 or the like may also be considered. Considering these conditions ensures determining presence or absence of collision with even high accuracy. Therefore, the unnecessary warning can be further reduced.

Thus, the embodiment reduces an unnecessary warning output for an operator. Therefore, the reliability of the output warning is enhanced.

In particular, a heavy haulage vehicle, such as a dump truck, is used in a mine, a construction site, and the like. Happenings of, for example, a collision accident of a heavy haulage vehicle with a light vehicle conveying luggage and personnel, a collision accident between heavy haulage vehicles, and a single car accident, such as falling, largely affect an execution of operation due to the halt of a mining operation in a mine or a construction work in a construction site in addition to a direct damage from the accident. Therefore, it is important to surely preventing the collision accident and the single car accident. Meanwhile, unnecessarily and frequently issuing the warning lowers the reliability of the warning. With the embodiment, since the necessity of the warning is determined by considering whether the collision risk is eliminated by the safety facility, such as the berm, between the host vehicle and other vehicles even in such an environment, it is possible to give a necessary and sufficient warning to ensure obtaining high reliability in the warning.

Second Embodiment

Next, a second embodiment of the present invention will be described. In this embodiment, a vehicle-to-vehicle communication is used for detecting means of other vehicles.

The safe driving assistance system 100 of the embodiment basically has a configuration similar to that of the first embodiment. The following describes the embodiment focusing on the configuration different from that of the first embodiment.

Figure 11:
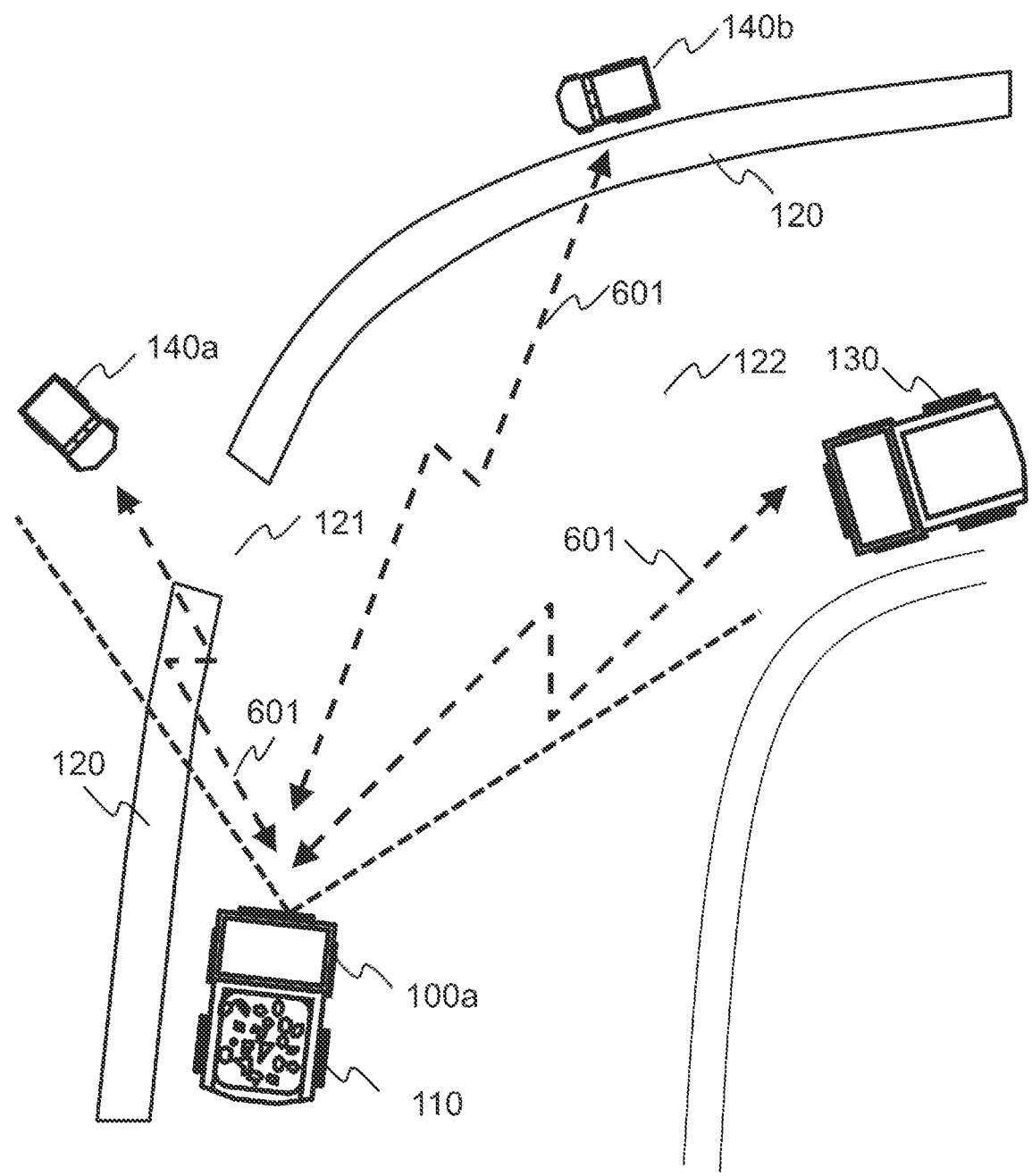
FIG. 11 is an explanatory drawing for explaining a usage environment of the safe driving assistance system of the second embodiment.

FIG. 11 is a drawing for describing a usage environment of a safe driving assistance system 100a of the embodiment.

The safe driving assistance system 100a of the embodiment is assumed to be used in a mine, similarly to the first embodiment. That is, the safe driving assistance system 100a is mounted on the large sized heavy machine vehicle 110, such as a dump truck and an excavator, that operates in the mine. However, in the embodiment, each vehicle mutually exchanges and detects each other's location information by a vehicle-to-vehicle communication 601.

Figure 2B:
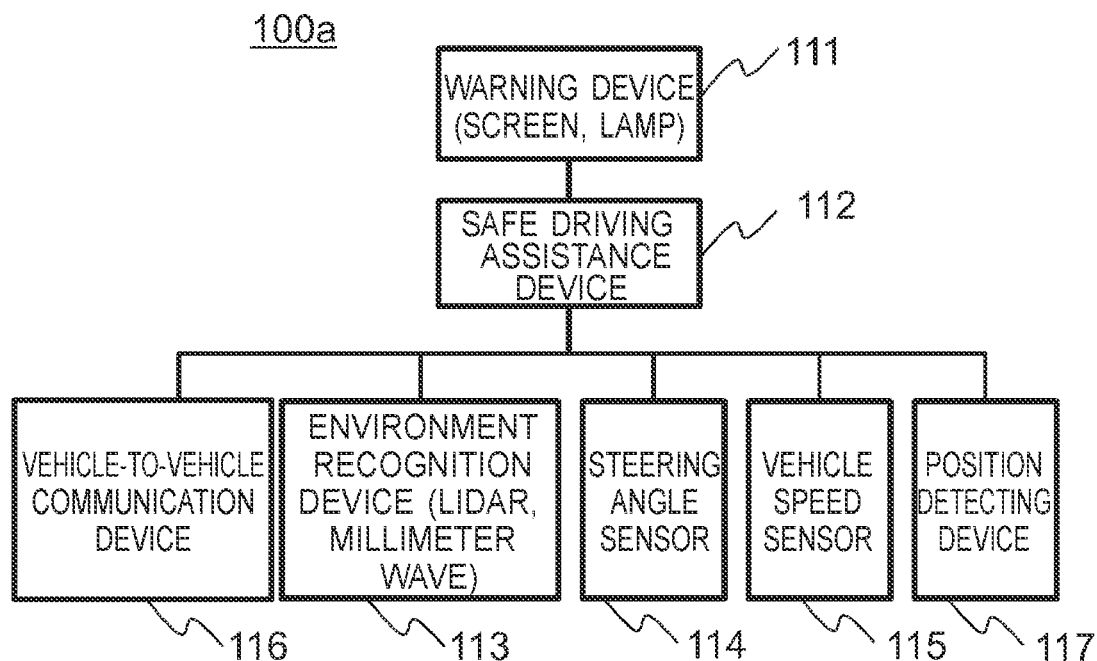
FIG. 2B is a block diagram of a safe driving assistance system of a second embodiment.

A function block of the safe driving assistance system 100a of the embodiment is illustrated in FIG. 2B. As illustrated in the drawing, the safe driving assistance system 100a of the embodiment basically has a configuration similar to that of the first embodiment. That is, the warning device 111, the environment recognition device 113, the steering angle sensor 114, and the vehicle speed sensor 115 are included. However, a safe driving assistance device 112a is included instead of the safe driving assistance device 112. The safe driving assistance system 100a of the embodiment includes a vehicle-to-vehicle communication device 116 and a position detecting device 117.

The position detecting device 117 obtains the position information of a vehicle on which this position detecting device 117 is mounted. The position information is obtained using, for example, a Global Navigation Satellite System (GLASS) that is a positioning system using a radio wave of a navigation satellite, such as a Global Positioning System (GPS) satellite. In this case, for example, the position information is obtained by latitude, longitude, and the like. Note that a reference point may be disposed in a mine and relative distances from there may be obtained as the position information.

The vehicle-to-vehicle communication device 116 receives position information data from each of other vehicles. The received position information data includes information to identify the other vehicles of the transmission origins (vehicle identification information) and position information of the other vehicles.

Note that, in the embodiment, each vehicle includes the position detecting device 117 and the vehicle-to-vehicle communication device 116. The position information of the vehicle obtained by the position detecting device 117 is mutually exchanged with the vehicle-to-vehicle communication via the vehicle-to-vehicle communication device 116 to detect the other vehicles. Other system configuration is similar to that of the first embodiment.

Figure 12:
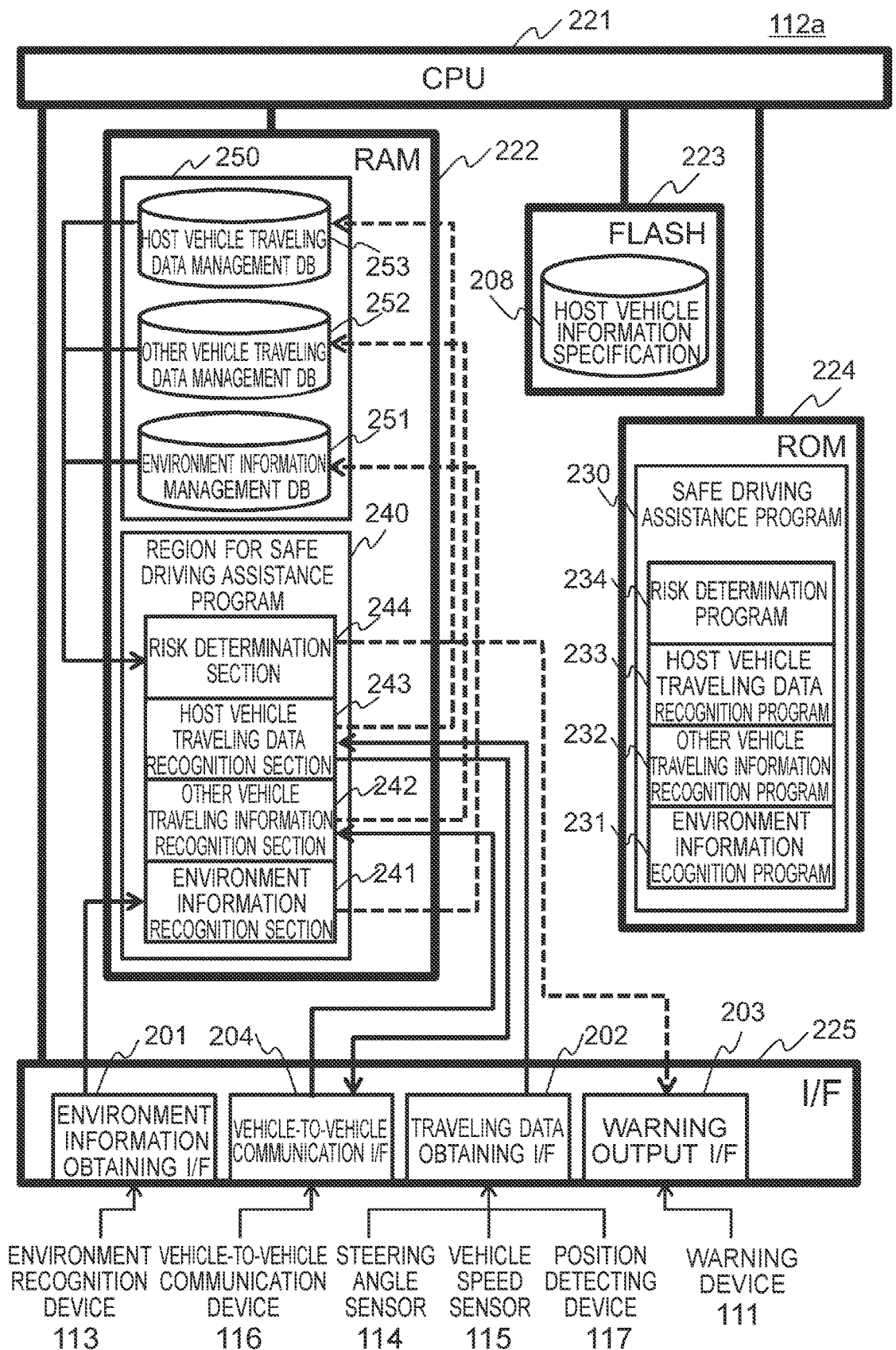
FIG. 12 is a block diagram of a safe driving assistance device of the second embodiment.

The safe driving assistance device 112a of the embodiment basically has a configuration similar to that of the first embodiment. However, as illustrated in FIG. 12, the safe driving assistance device 112a of the embodiment obtains the information on other vehicles with the vehicle-to-vehicle communication. In view of this, a vehicle-to-vehicle communication I/F 204 is further included.

The vehicle-to-vehicle communication I/F 204 is an interface with the vehicle-to-vehicle communication device 116. From the vehicle-to-vehicle communication device 116, the other vehicle traveling information of other vehicles is obtained.

The other vehicle traveling information recognition section 242 receives the other vehicle traveling information from the environment information obtaining I/F 201 in the first embodiment. However, in this embodiment, the other vehicle traveling information is received from the vehicle-to-vehicle communication I/F 204.

Note that the other vehicle traveling information received via the vehicle-to-vehicle communication I/F 204 is a value of the coordinate system employed by the position detecting device 117 as described above. Therefore, the other vehicle traveling information recognition section 242 of the embodiment converts a value depending on the coordinate system, such as the position information and the traveling direction, among the other vehicle traveling information into a value of a local coordinate system to register the value in the other vehicle traveling data management DB 252.

At this time, the vehicle identification information obtained with the vehicle-to-vehicle communication is stored as the identifier 421. The speed and the traveling direction are calculated from the position information 422 of the other vehicle. On the other hand, the width 427, the length 428, and the type of vehicle 429 are obtained from information preliminarily held for the types of vehicles that possibly travel in the mine, similarly to the first embodiment. Note that these pieces of information may be held being associated with the vehicle identification information.

The host vehicle traveling data recognition section 243 periodically transmits the host vehicle traveling data managed by the host vehicle traveling data management DB 253 to other vehicles via the vehicle-to-vehicle communication I/F 204 in addition to the function of the above described first embodiment.

Note that, the risk determination method and the like of the embodiment is basically similar to that of the first embodiment. In view of this, it is similar to the first embodiment, thereby omitting the explanation.

As described above, the safe driving assistance device 112 of the embodiment includes the region setting section 269, the determination section 268, and the warning section (the warning generation section 267 and the warning device 111). The region setting section 269 sets a risk determination region of a vehicle on environment data using travel data including a current position, a traveling direction, and a speed of the vehicle, a vehicle specification including a size of the vehicle, and the environment data including altitudes of a geography. The determination section 268 determines presence or absence of a collision risk between a host vehicle and another vehicle for determination using a host vehicle region as the risk determination region of the host vehicle 110, another vehicle region as the risk determination region of the other vehicle for determination as a determination target other vehicle, and the environment data. The warning section outputs a warning when the determination section determines that the collision risk is present. The other vehicle travel data is obtained with a vehicle-to-vehicle communication.

The embodiment ensures reducing generation of warning in consideration of the obstacles, such as the berm 120 or the like between the host vehicle 110 and the other vehicle for determination, similarly to the first embodiment. In view of this, the warning can be output with further high accuracy, similarly to the first embodiment.

Furthermore, in this embodiment, the position information among the other vehicle information is obtained with the vehicle-to-vehicle communication. In view of this, the position information of other vehicles can be obtained with further high accuracy. Therefore, the warning can be output with further high accuracy.

<Modification>

Note that, while in the above described embodiments, the risk determination section 244 determines presence or absence of the collision risk, it is not limited to this. For example, it may be configured to provide a plurality of levels for the collision risk and determine the level (warning level). In this case, the risk determination section 244 generates warning data corresponding to the warning level and output the warning data to the warning device 111.

The warning level is, for example, preliminarily determined corresponding to a condition of the host vehicle 110, the other vehicle for determination, and the environment information.

For example, the respective different warning levels are preset to each state, such as a first state in which no overlap is present between the host vehicle region 511 and the other vehicle region 531 as illustrated in FIG. 7A, a second state in which an overlap between the host vehicle region 511 and the other vehicle region 531 is present, but the berm 120 or the like is present in between as illustrated in FIG. 8A, a third state in which no overlap is present between the host vehicle region 511 and the other vehicle region 531, but the clearance 121 is present in between as illustrated in FIG. 8B, and a fourth state in which the host vehicle region 511 and the other vehicle region 531 overlap, but no berm 120 or the like is present in between as illustrated in FIG. 7B.

A plurality of phases of warning levels may be further set into the above described second state, in relation with the vehicle speed, the diameter of the wheel, and the height of the obstacle.

When the warning level is thus set for each state, the determination section 268 outputs the other vehicle risk signal corresponding to the warning level to the warning generation section 267. The warning generation section 267 generates the warning data having a warning degree corresponding to the warning level. The generated warning data is, for example, preliminarily held in the ROM 224 or the like for each level.

Note that the present invention is not limited to the above described embodiments, but various modifications are included. For example, the above described embodiments are described in details in order to describe the present invention to be easily understood, and are not necessarily limited to include all the described configurations.

LIST OF REFERENCE SIGNS 100 safe driving assistance system
100a safe driving assistance system
110 large sized heavy machine vehicle (host vehicle)
110w wheel
111 warning device
112 safe driving assistance device
112a safe driving assistance device
113 environment recognition device
114 steering angle sensor
115 vehicle speed sensor
116 vehicle-to-vehicle communication device
117 position detecting device
120 berm
121 clearance
122 travel route
130 large sized heavy machine vehicle
140 general vehicle
140a general vehicle
140b general vehicle
201 environment information obtaining I/F
202 traveling data obtaining I/F
203 warning output I/F
204 vehicle-to-vehicle communication I/F
221 CPU
222 RAM
223 FLASH memory
224 ROM
225 I/F
230 safe driving assistance program 231 environment information recognition program
232 other vehicle traveling information recognition program
233 host vehicle traveling data recognition program
234 risk determination program
240 region for safe driving assistance program
241 environment information recognition section
242 other vehicle traveling information recognition section
243 host vehicle traveling data recognition section
244 risk determination section
250 temporary storage region
251 environment information management DB
252 other vehicle traveling data management DB
253 host vehicle traveling data management DB
254 host vehicle specification
261 timer for periodic processing
262 host vehicle region setting section
263 other vehicle region setting section
264 overlap determination section
265 redetermination section
266 environmental collision risk determination section
267 warning generation section
268 determination section
269 region setting section
271 environment information
272 other vehicle traveling information
310a display screen
310b display screen
311 icon
312 graphic
313 icon
314 message
411 traveling direction
411a traveling direction
412 grid region
413 grid region
414 grid region
421 identifier
422 position information
425 speed
426 traveling direction
429 type of vehicle
430 registered time
511 host vehicle region
512 second host vehicle region
521 berm region
531 other vehicle region
532 other vehicle region
601 vehicle-to-vehicle communication

The invention claimed is:

1. A safe driving assistance device comprising:
a position detecting device that obtains current position information of a vehicle;
a vehicle speed sensor and a steering angle sensor that obtain travel data including a traveling direction and a speed;
a storage device that stores a vehicle specification including a size of the vehicle;
an environment recognition device that obtains environment data including an altitude of a geography;
a vehicle-to-vehicle communication device that wirelessly and communicatively couples the vehicle to another vehicle;
a region setting section that sets a collision risk determination region used for determining presence or absence of a collision risk of a host vehicle; and
a determination section that:
sets a host vehicle collision risk determination region, the host vehicle collision risk determination region being the collision risk determination region of the host vehicle, based on travel data of the host vehicle, the vehicle specification of the host vehicle, and the environment data obtained by the host vehicle,
obtains an other vehicle collision risk determination region through the vehicle-to-vehicle communication device, the other vehicle collision risk determination region being the collision risk determination region of the other vehicle as a collision risk determination target with the host vehicle set by the other vehicle, and
determines a collision risk between the host vehicle and the other vehicle using the host vehicle collision risk determination region, the other vehicle collision risk determination region, and the environment data,
wherein the determination section includes:
an overlap determination section that determines presence or absence of an overlap between the host vehicle collision risk determination region and the other vehicle collision risk determination region to determine that the collision risk is present when the overlap is present; and
a redetermination section that redetermines the collision risk by referring to the environment data and using the travel data and the vehicle specification to determine that no collision risk is present when an obstacle region is present as a region having a height equal to or more than a height which can be gone over by the host vehicle between a current position of the host vehicle and a current position of the other vehicle on the environment data even if the overlap determination section determines that the collision risk is present.

2. The safe driving assistance device according to claim 1, wherein the vehicle specification includes a diameter of a wheel of the host vehicle as a size of the vehicle, and the redetermination section redetermines that the collision risk is present or not when a ratio of the height of the obstacle region in the environment data to the diameter of the wheel of the host vehicle is less than a predetermined value, even if the obstacle region is present.

3. The safe driving assistance device according to claim 2, wherein the redetermination section determines that no collision risk is present when a speed of the host vehicle is less than a preliminarily determined reference speed, even if the ratio of the height of the obstacle region with respect to the diameter of the wheel of the host vehicle is less than the predetermined value.

4. The safe driving assistance device according to claim 1, wherein the redetermination section determines that the collision risk is present when a clearance region that has a height that allows the other vehicle as a collision risk determination target with the host vehicle to travel and has a width equal to or more than a width of the other vehicle is present on the environment data along the other vehicle collision risk determination region, even if the obstacle region is present.

5. The safe driving assistance device according to claim 1, wherein the region setting section sets a region that has a length corresponding to the speed in a traveling direction of the vehicle as the collision risk determination region.

6. The safe driving assistance device according to claim 5, wherein the region setting section changes the traveling direction along an obstacle region to set a second collision risk determination region when the obstacle region is present in the set collision risk determination region, and the obstacle region is a region that has a height equal to or more than a preliminarily determined value on the environment data.

7. The safe driving assistance device according to claim 1, further comprising
a warning section that outputs a warning when the determination section determines that the collision risk is present.

8. A safe driving assistance device comprising:
a position detecting device that obtains current position information of a vehicle;
a vehicle speed sensor and a steering angle sensor that obtain travel data including a traveling direction and a speed;
a storage device that stores a vehicle specification including a size of the vehicle;
an environment recognition device that obtains environment data including an altitude of a geography and an other vehicle travel data as traveling information of another vehicle;
a region setting section that sets a collision risk determination region used for determining presence or absence of a collision risk of a host vehicle; and
a determination section that:
sets a host vehicle collision risk determination region, the host vehicle collision risk determination region being the collision risk determination region of the host vehicle, based on travel data of the host vehicle, the vehicle specification of the host vehicle, and the environment data obtained by the host vehicle,
sets an other vehicle collision risk determination region based on the other vehicle travel data obtained by the environment recognition device, the other vehicle collision risk determination region being the collision risk determination region of the other vehicle as a collision risk determination target with the host vehicle set by the other vehicle, and
determines a collision risk between the host vehicle and the other vehicle using the host vehicle collision risk determination region, the other vehicle collision risk determination region, and the environment data,
wherein the determination section includes:
an overlap determination section that determines presence or absence of an overlap between the host vehicle collision risk determination region and the other vehicle collision risk determination region to determine that the collision risk is present when the overlap is present; and
a redetermination section that redetermines the collision risk by referring to the environment data and using the travel data and the vehicle specification to determine that no collision risk is present when an obstacle region is present as a region having a height equal to or more than a height which can be gone over by the host vehicle between a current position of the host vehicle and a current position of the other vehicle on the environment data even if the overlap determination section determines that the collision risk is present.

9. The safe driving assistance device according to claim 8, wherein the vehicle specification includes a diameter of a wheel of the host vehicle as a size of the vehicle, and
the redetermination section redetermines that the collision risk is present or not when a ratio of the height of the obstacle region in the environment data to the diameter of the wheel of the host vehicle is less than a predetermined value, even if the obstacle region is present.

10. The safe driving assistance device according to claim 9,
wherein the redetermination section determines that no collision risk is present when a speed of the host vehicle is less than a preliminarily determined reference speed, even if the ratio of the height of the obstacle region with respect to the diameter of the wheel of the host vehicle is less than the predetermined value.

11. The safe driving assistance device according to claim 8,
wherein the redetermination section determines that the collision risk is present when a clearance region that has a height that allows the other vehicle as a collision risk determination target with the host vehicle to travel and has a width equal to or more than a width of the other vehicle is present on the environment data along the other vehicle collision risk determination region, even if the obstacle region is present.

12. The safe driving assistance device according to claim 8,
wherein the region setting section sets a region that has a length corresponding to the speed in a traveling direction of the vehicle as the collision risk determination region.

13. The safe driving assistance device according to claim 12,
wherein the region setting section changes the traveling direction along an obstacle region to set a second collision risk determination region when the obstacle region is present in the set collision risk determination region, and
the obstacle region is a region that has a height equal to or more than a preliminarily determined value on the environment data.

14. The safe driving assistance device according to claim 8, further comprising
a warning section that outputs a warning when the determination section determines that the collision risk is present.

* * * * *